(12) United States Patent
Duncan et al.

(10) Patent No.: US 7,961,727 B2
(45) Date of Patent: *Jun. 14, 2011

(54) METHOD AND APPARATUS FOR FORWARDING PACKETS

(75) Inventors: Ian H Duncan, Ottawa (CA); Ken Young, Kanata (CA); Grant Hall, Kanata (CA); James Watt, Kanata (CA)

(73) Assignee: Alcatel-Lucent Canada Inc., Kanata, ON (CA)

( * ) Notice: Subject to any disclaimer, the term of this patent is extended or adjusted under 35 U.S.C. 154(b) by 141 days.

This patent is subject to a terminal disclaimer.

(21) Appl. No.: 12/502,491

(22) Filed: Jul. 14, 2009

(65) Prior Publication Data

US 2010/0014518 A1    Jan. 21, 2010

Related U.S. Application Data

(63) Continuation of application No. 09/509,872, filed on Sep. 11, 2000, now Pat. No. 7,583,665.

(30) Foreign Application Priority Data

Oct. 3, 1997   (CA) ..................................... 2217275

(51) Int. Cl.
    *H04L 12/28* (2006.01)
(52) U.S. Cl. ........ 370/389; 370/390; 370/392; 370/401; 709/232; 709/247

(58) Field of Classification Search .......... 370/389–402, 370/395.1–395.61, 351; 709/223, 249
See application file for complete search history.

(56) References Cited

U.S. PATENT DOCUMENTS

| 5,490,252 | A | * | 2/1996 | Macera et al. ................ 370/402 |
| 5,550,816 | A | * | 8/1996 | Hardwick et al. ............ 370/397 |
| 5,566,170 | A | * | 10/1996 | Bakke et al. .................. 370/392 |
| 5,583,862 | A | * | 12/1996 | Callon ......................... 370/397 |
| 5,825,772 | A | * | 10/1998 | Dobbins et al. .............. 370/396 |
| 5,828,844 | A | * | 10/1998 | Civanlar et al. ............. 370/401 |
| 5,845,091 | A | * | 12/1998 | Dunne et al. ................. 370/400 |
| 5,951,651 | A | * | 9/1999 | Lakshman et al. ........... 370/389 |
| 6,085,238 | A | * | 7/2000 | Yuasa et al. .................. 709/223 |
| 6,147,976 | A | * | 11/2000 | Shand et al. ................. 370/401 |
| 6,650,631 | B1 | * | 11/2003 | Benash et al. ................ 370/352 |
| 7,583,665 | B1 | * | 9/2009 | Duncan et al. ............... 370/389 |

* cited by examiner

*Primary Examiner* — Steven H Nguyen
(74) *Attorney, Agent, or Firm* — Marks & Clerk

(57) ABSTRACT

An internetworking system operating over an ATM backbone. The physical internetworking devices within the system are shared to provide the internetworking functions while servicing two or more distinct and isolated user networks. This is accomplished by logically partitioning the devices into distinct sub-elements which provide all or part of the internetworking functions. These sub-elements are uniquely allocated to independent realms which are then assigned to specific user networks.

3 Claims, 7 Drawing Sheets

METHOD AND APPARATUS FOR FORWARDING PACKETS

TECHNICAL FIELD

This invention relates to the provision of internetworking and more particularly to a system and method wherein a common backbone infrastructure is shared by several distinct user networks.

BACKGROUND ART

Multi-protocol over ATM (MPOA) represents an important development in the communications industry in that it permits the internetworking of local area networks (LANs) over an ATM backplane. This internetworking leads to the efficient delivery of a range of multimedia services such as video, voice, image and data.

Heretofore, MPOA internetworking architectures have not been capable of servicing more than one user network. Current internetworking devices within the network architecture provide one or more functions related to forwarding data packets through a network. The primary keys used to control internetworking forwarding functions are network addresses. Within a particular network these network address keys must be unique for the correct operation of the forwarding functions. In many internetworking systems, in particular those based on the internet protocol, the correct operation of the forwarding functions requires the additional constraint that these network address keys be organized in an ordered hierarchy of partial address prefixes where the unique set of keys used to control the internetworking forwarding function at different points within the network are different. In current systems, a router and bridge combination sometimes known as a ridge provides the address keys in order to forward the data packets to the proper destination.

DISCLOSURE OF INVENTION

The purpose of the present invention is to permit the sharing of physical devices that provide the internetworking functions while servicing two or more distinct and isolated user networks. This is accomplished by logically partitioning the devices into distinct sub-elements which provide all or part of a specific internetworking function including: physical interfaces; connectivity contexts; dynamic storage and context for routing calculations; storage and context for forwarding information; storage for queuing of packets being forwarded; and the necessary storage and context of secondary elements of the internetworking forwarding functions. The sub-elements of the device are then uniquely allocated to independent realms. These independent realms are assigned to specific user networks preserving the necessary uniqueness and any local differences in the primary address keys and all other secondary information used in the correct operation of the internetworking forwarding function.

Therefore, in accordance with a basic aspect of the present invention there is provided in a system for delivering internetworking service functions utilizing internetworking devices a method of providing the services to two or more specific network users, the method comprising: logically partitioning the devices into sub-elements; allocating the sub-elements to independent realms; and assigning the independent realms to the specific network users.

According to a second aspect of the invention there is provided a system for delivering internetworking services to two or more specific network users comprising: internetworking devices logically partitioned into sub-elements; independent realms including the logically partitioned sub-elements; and assignment means to assign the independent realms to the specific network users.

The present invention provides a distributed system built from collaborating internetworking devices and provides for large-scale internetworking services for carriers and service providers. This is known herein as carrier scale internetworking or CSI. The purpose of CSI is to meet the future needs of the large providers of internetworking (e.g., bridging and routing) services. To do so, CSI provides services with a number of key properties including:

a) public and private internet services;
b) private bridged services;
c) customer isolation;
d) customer-specific differentiated service for both configured and dynamically detected flows;
e) reduction of relative complexity of management;
f) modularity of functions, such that the CSI system works together as a whole, but functions can be replaced individually with constrained impact;
g) explicit support for network engineering;
h) coexistence with other services running on the underlying fabric;
i) a high number of customer connection points;
j) independence from the number of simultaneous flows;
k) high availability; and
l) high stability, including routing.

The following provides an overview of the CSI system framework.

CSI is a system of components acting together to provide routing and forwarding. The functions, traditionally all treated as a unit and labeled "routing", can be separated beneficially. In particular, path discovery, topology management, and route computation can be separated from packet classification, marking, and queue management. This is one of the fundamental principles of CsI.

CSI thus includes components which work together to provide access, control, routing and forwarding, as shown in FIG. 10. Inside a CSI system, this separation of functions enhances flexibility, scalability and manageability. Outside a CSI system, the CSI system appears to behave like one or more legacy routers.

Together with reference to FIG. 10, the following description of the CSI framework first discusses external interfaces between a CSI system and the rest of the world. It then describes each component of the framework and its functions in a CSI system, and lays out the interfaces and interactions between them. Here are some concepts which are not CSI specific but which are used in describing CSI.

Flow: As used here, a flow is any set of packets which can be clearly distinguished from all the others passing through a forwarding entity, using simple rules. A flow could be, for example, all packets with a specific combination of source address, destination address, and port. It could also be all packets with a certain value in the IPv4 header TOS byte.

Interface: An interface is between two entities, not simply the edge of one or the other of them. An interface implies connectivity-if a fabric-level connection does not exist, an interface cannot be established.

A CSI system's external interfaces are known as access interfaces. They are provided at access terminations. By design, CSI can support any access interface which carries IP packets and/or bridged PDUs. These interfaces may be either physical or virtual (e.g. an ATM VCC).

Through access interfaces, CSI offers services. Two services defined in CSI are, for example:

1) Public Internet service, which is managed connectivity to the public internet.

2) Virtual Private Network (VPN) service, which is managed connectivity to a virtual private network. A virtual private network may include both virtual LANs (bridged connectivity) and virtual subnets (network layer connectivity).

A realm is a specific instance of a Public Internet or VPN service. Resources (such as bandwidth and address space) and policy (such as routing, forwarding or CoS) are segregated between realms. An access interface may be one of three kinds: routed (IP only), VLAN, and VLAN over which routing exchanges may take place.

A public internet realm supports only Layer 3 IP capabilities, although access interfaces will support Layer 2 functions as necessary to do so (e.g. Frame Relay functions). An access interface may have more than one IP address associated with it.

The CSI framework does not impose any constraints that prevent a public internet realm from providing advanced internet forwarding features such as source-based forwarding, MPLS, or differentiated services. Services which are intermediate between the currently defined services are feasible.

There may be multiple VLANs differentiated by a protocol family within a single VPN realm. Different PDUs from a single end station may be injected into different virtual LANs or virtual subnets. Within a VPN realm, VLANs are interconnected with routed interfaces.

The foundation of a CSI system is an ATM network. On this ATM network, CSI coexists with other services which might be offered, such as circuit emulation. ATM itself is not strictly necessary. CSI could be run over other subnetwork layers and even multiple interworking subnetwork layers. The minimal requirements are a high-speed environment in which: virtual connections are possible (the subnetwork details are hidden from the CSI components); virtual connections can be set up dynamically; and virtual connections may have quality of service differentiation sufficient to support the desired IP QoS differentiation.

Network management is required as part of the CSI framework. Network management mechanisms exist independently of any interactions between CSI components, and CSI interactions do not restrict network management to specific mechanisms. There are a few areas where CSI expects network management to perform some function.

A CSI configuration server is an agent of network management. A configuration server receives information from network management regarding which CSI components should communicate with others under which conditions. It then provides all other CSI components with the basic configuration information they need to communicate, and to establish bindings between interfaces, services and realms. Configuration servers provide configuration services to each component when it becomes operational, and may update that information at any time.

The edge of a CSI system is an access termination. Access terminations provide access interfaces. Access terminations act as aggregation and distribution points, collecting traffic from access networks to distribute to one or more edge forwarders across service interfaces, and distributing traffic from one or more edge forwarders to one or more access networks. The distribution of traffic is controlled by network management. Access terminations may provide limited service differentiation through traffic prioritization between interfaces, under the control of network management. Access terminations do not do any filtering or traffic shaping for incoming traffic except that required by layer 2.

Edge forwarders provide all functions related to forwarding in the CSI system. While access terminations will distinguish between traffic destined to different edge forwarders, edge forwarders are responsible for more complex service differentiation, interworking of CSI and other mechanisms for providing VPN support, and also for some manipulation of packets. Where the control plane of an external protocol family includes authentication, for example with PPP, the edge forwarder will perform preliminary authentication of users, since this may affect the distribution of traffic. Edge forwarders represent the CSI system at the internet level, for example by responding to IP-based echo requests. Edge forwarders also provide all other functions associated with higher layer protocols, such as support for proxy ARP and inverse ARP, and may act as a proxy for some services such as DHCP. They may make use of other resources, such as CSI routing services, to perform these functions.

Edge forwarders are responsible for forwarding, but not for routing. For routing they depend on routing services. Edge forwarders classify packets according to realm and quality of service, mark and manipulate packets, and provide differential policing and scheduling for flows, all according to instructions from routing services. The complexity of the information and instructions which edge forwarders receive from routing services is not limited by the framework.

Edge forwarders may also detect flows and, with the help of routing services, create "shortcut" VCCs to other forwarders when appropriate.

For ease of discussion edge forwarders may be characterized as transit or non-transit. A transit forwarder has more than one transport interface to other forwarders within its CSI system, and is able to forward traffic between them. A non-transit forwarder may or may not have more than one transport interface to other CSI forwarders, but in any case it is not able to forward between them—only between CSI transport interfaces and service interfaces.

The two functions of access termination and edge forwarder may be considered as a unit, collectively known as a service point. In some implementations the two functions may be tightly coupled. Even if they are combined, they are logically distinct. If they are separate, there is no reason why an access termination might not establish relationships with physically distant edge forwarders.

A core forwarder is a low overhead, possibly high speed, internet-layer forwarding device in the core of the CSI network. Core forwarders are not necessary to the functioning of a CSI system, and are provided to support scalability (by making it possible to reduce the number of VCCs between edge forwarders and by offering a forwarding path for forwarders which cannot hold full forwarding databases). A core forwarder has no service interfaces and runs no routing protocols. It receives instructions from routing services and provides transport within a single realm. By definition, core forwarders are transit forwarders. As much as possible, special capabilities are implemented in other forwarders, thus allowing the core forwarder to support high speed and high capacity without high overhead. Although some end-to-end features require support in all forwarders (e.g. QoS differentiation), in the core forwarder speed and capacity are far more important than feature richness. If an approach allows one to support a particular feature in CSI without adding complexity to core forwarders, that approach should be given serious consideration.

Realms may require detailed per-flow forwarding policy. In realms which are smaller in scale it is both possible and attractive not to give edge forwarders pre-loaded complete forwarding information for all the situations they may be required to deal with, and instead to have them ask for that information as needed and cache it. Rather than drop packets while they are retrieving this information, edge forwarders may forward them to the default forwarder. The default forwarder is more sophisticated than a core forwarder, in that it must take policy information into account when deciding how to forward. However, like a core forwarder it is a transit forwarder which runs no routing protocols and has no service interfaces.

For robustness the default forwarder function must have intimate knowledge of routing services policy. There is no protocol or interface defined for this visibility, and its acquisition is not covered in this framework.

In CSI the functions of routing are explicitly separated from the functions of forwarding. Routing services are responsible for routing, while forwarders are responsible for forwarding.

Routing services are provided by routing services control points (RSCPs). RSCPs present one or more routing services instances (RSIs). RSIs are the means by which routing services communicate with a particular realm. RSIs are not in any user data path, and are not responsible for forwarding any user data. CSI forwarders establish associations with one or more RSIs on one or more RSCPs.

RSIs are responsible for all exchanges of routing information with peers both inside and outside a CSI realm. RSIs take in routing information from other routing entities, other RSIs, and from forwarders (regarding connectivity to other forwarders and external entities) They calculate routing information for each forwarder for which they are responsible and distribute the results to the forwarders. They also distribute related configuration information such as interface bindings. Route distribution may be done in advance or on demand. A realm may have more than one RSI operating in it for scaling purposes.

For ease of discussion an RSI and its client forwarders are collectively referred to as a logical router (LR). In a logical router, the RSI represents the logical router in routing protocol exchanges, and the combination of the RSI and the forwarders appears in routing protocols as a single routing node. A forwarder may be a client of different RSIs for different realms, and thus may participate in multiple LRs. An RSI participates in only one LR. The minimum LR is an RSI and a (non-transit) edge forwarder.

Components which interact closely with routing services, i.e. the CONS and the default forwarder, may be bundled with routing services in an implementation, just as edge forwarders and access terminations may be combined. Logically they are best considered as separate regardless.

Next is described the communications interfaces used by CSI components, followed by descriptions of protocol interactions which use these interfaces.

There are five types of internal interface:

1) Management interfaces carry interactions between network management and CSI components. Management mechanisms are not discussed further here except to the extent that they are related to other CSI interactions.

2) Configuration interfaces carry configuration information between configuration services and other CST components except access terminations. Configuration services do not interact with access terminations—if forwarder components are separate from the edge access terminations, the access termination configuration is done through network management.

3) Control interfaces carry control information between an RSI and the forwarders associated with it. From the RSI they carry information regarding service interfaces such as IP addresses and forwarding policies to apply. From forwarders to RSIs they carry information on connectivity between forwarders and also between forwarders and external entities.

4) Service interfaces carry user traffic between access terminations and edge forwarders in cases where the two functions are separated. An access termination may map multiple access interfaces to a single service interface.

5) Transport interfaces carry user information between forwarders. Traffic with different QoS requirements may be carried in different VCCs. Within a single realm and a single QoS, multipoint-to-point VCCs may be used to reduce the number of VCCs a forwarder must support.

An interface implies connectivity, i.e. an interface exists only if a fabric-level connection between two CSI components exists.

Except for management interfaces, all interfaces are based on ATM VCCs. Within a VCC, AAL5 is used, and all packets are encapsulated using the LLC part of RFC 1483 for ATM. QoS parameters depend on the specific use of the VCC. Signaling requires explicit QoS parameter signaling in addition to UNI 3.1 semantics.

For configuration, control, and transport interfaces, SVCs are used, for robustness and manageability. B-HLI information elements are used to carry SVC attributes such as its purpose (e.g. management). Control interface SVCs are "persistent", i.e. if SVC connectivity is lost the CSI components will reestablish the SVC immediately. Transport interfaces which are created based on preconfigured information from the RSI are persistent, while transport SVCs which are created due to flow detection are not expected to be persistent, and are released if inactive.

Either side of an interface may attempt to establish the underlying connection if needed. Duplicate connections are dealt with through simple conventions. In cases where an interface relationship is asymmetric, it is up to the client component to establish the association. Where it is symmetric, both components try to establish the association. If an SVC cannot be created for some reason, an algorithm of increasing backoff and retry may be used.

|      | AT | Cons | RS | EF | CF | DF |
|------|----|------|----|----|----|----|
| AT   |    |      |    | s  |    |    |
| Cons |    |      | x  | x  | x  |    |
| RS   |    |      | c  | c  | c  |    |
| EF   |    |      |    | pd | pd | p  |
| CF   |    |      |    |    | pd |    |
| DF   |    |      |    |    |    | p  |

Interfaces between CSI Components.
x: configuration.
s: service.
p: persistent transport.
d: dynamic transport.
c: control.

The above table shows the possible interfaces between components. "Persistent transport" refers to transport SVCs which are established at startup and are maintained. "Dynamic transport" refers to transport SVCs which are established when a forwarder believes them to be appropriate, and which are taken down when they are idle.

Having regard to configuration interactions, all CSI devices are given an ATM anycast address which they can use to discover an appropriate configuration server (CONS). When a CSI component is first initialized, it registers with a CONS as its client. The CONS keeps state information for each of its clients, and will update them upon any configuration changes they need to be aware of for their proper functioning. Since ATM anycast addresses are used to establish persistent SVCs, in the case of SVC failure it is possible that the new connection will be established with a different CONS.

At initialization, each individual RSCP registers with a CONS, and in the ensuing dialog receives information it needs for its operation. This information includes the RSIs to be running on the RSCP, the CSI realms for which the RSIs are responsible, any RSCP redundancy information, and the control interfaces which it should establish with other RSIs and external entities. It also includes detailed information which the RSI will need to manage the forwarders which register with it.

An edge forwarder registers with a CONS in the usual way and is given a list of RSCPs supporting the RSIs it should register with, along with the QoS parameters to use when contacting the RSIs.

The CONS also has RSCPs as clients. If it detects addition, deletion, and failure of relevant RSCPs, it will notify the edge forwarder of the changes. If an edge forwarder is unable to maintain an interface with a particular RSI, it will notify the CONS.

Core forwarder configuration is very much like that of an edge forwarder, except that a core forwarder does not require information specific to access interfaces (such as PPP authorization information).

Default forwarders rely on close association with an RSI for their information.

As for control interactions, after a forwarder has received information from configuration services, it will establish an association with each of its RSIs, and register with each as a client.

An edge forwarder then learns the realms being served by each RSI and detailed information about the external interfaces it is to support for each realm, such as subnet/VLAN configuration.

The RSIs use routing information from internal and external peers, information received from forwarders about links to other forwarders (in public internet realms), and policy information from network management, to compute forwarding rules for each forwarder in the CSI system for which they are responsible. They then provide this forwarding information to the forwarders as required.

RSIs provide forwarders with information on packet classification and filtering, packet forwarding, and queuing treatments to be applied to different classes of packets, at both the IP and subnetwork levels. These rules may depend on a wide range of criteria at multiple layers.

The information transmitted to a forwarder may include instructions regarding persistent links which the forwarder shall establish with other forwarders. As a forwarder establishes and loses such links with other forwarders, it keeps its RSIs notified of the changes. RSIs are not notified of temporary shortcuts established due to flow detection.

RSIs may also transmit other instructions to forwarders-for example RSIs may send an IP packet to a forwarder, encapsulated, with instructions to forward that packet out a particular interface.

RSIs are also responsible for computing multicast forwarding rules for the forwarders. Multicast within bridged realms is managed following the usual mechanisms for VLANs. Multicast join and leave requests which are received from outside the CSI system are propagated from the forwarders to the RSIs, which then distribute the appropriate forwarding rules in response.

If a forwarder loses its control interface with an RSI, and is not able to reestablish it within a short time, it should flush any information it obtained from that RSI and report the loss to configuration services.

The differences in what an edge forwarder receives from an RSI and what other forwarders receive from an RSI is similar to the differences in what forwarders receive from configuration services. Core forwarders need information on interfaces to establish with other forwarders, but do not need external interface information. Core forwarders report connectivity just as edge forwarders do. Default forwarders need highly detailed policy information.

RSIs communicate with each other for several control purposes, depending on the relationship between the RSCPs.

Between RSIs and routing entities outside of the RSIs' realms, RSIs use either internal or external routing protocols to exchange routing information, and NHRP to support the creation of shortcut transport connections. This communication is mediated by edge forwarders.

Within a public internet realm, they use iBGP4 and NHRP, and an IGP. An iBGP attribute may be used to distribute the IP address of the egress edge forwarder for external destinations. They also use a realm topology management. protocol to communicate realm topology information received from forwarders. NHRP between RSIs includes support for IP QoS.

Within a VPN realm, they communicate using an IGP and NHRP.

With respect to service interactions, an access termination examines incoming traffic and redistributes it to one or more edge forwarders in one or more VCCs. An access termination interacts only with network management and with edge forwarders.

In general a service interface will carry traffic for only one realm. However, there may be higher layers involved in VPN multiplexing, for example IP encapsulation or MPLS. In those cases the edge forwarder will need to demultiplex the VPN traffic.

Lastly, regarding transport interactions, edge forwarders establish connections with other forwarders for two reasons. First, if instructed to do so, and second, if a flow is detected and the edge forwarder considers a direct "shortcut" connection to be appropriate. Based on forwarding policies received from RSIs, edge forwarders forward IP packets as required on their transport and service interfaces. The forwarding function includes IP control functions such as generation of ICMP messages for external peers, and source verification.

Default forwarders forward packets based on their intimate knowledge of RSI policy. Since a particular traffic flow through a default forwarder can be expected to be temporary, lasting only until the source forwarder establishes a direct transport connection, default forwarders never attempt to form shortcut connections.

Core forwarders establish connections and forward packets per RSI instructions. Core forwarders would rarely, if ever, be the target of an on-demand connection. In a CSI system where core forwarders were deployed, the scale of the traffic would likely be such that connections to core forwarders would be preconfigured.

BRIEF DESCRIPTION OF THE DRAWINGS

The invention will be better understood from the following embodiment description of a carrier scale internetworking (CSI) system together with reference to the accompanying drawings, in which.

BEST MODE FOR CARRYING OUT THE INVENTION

Figure 1:
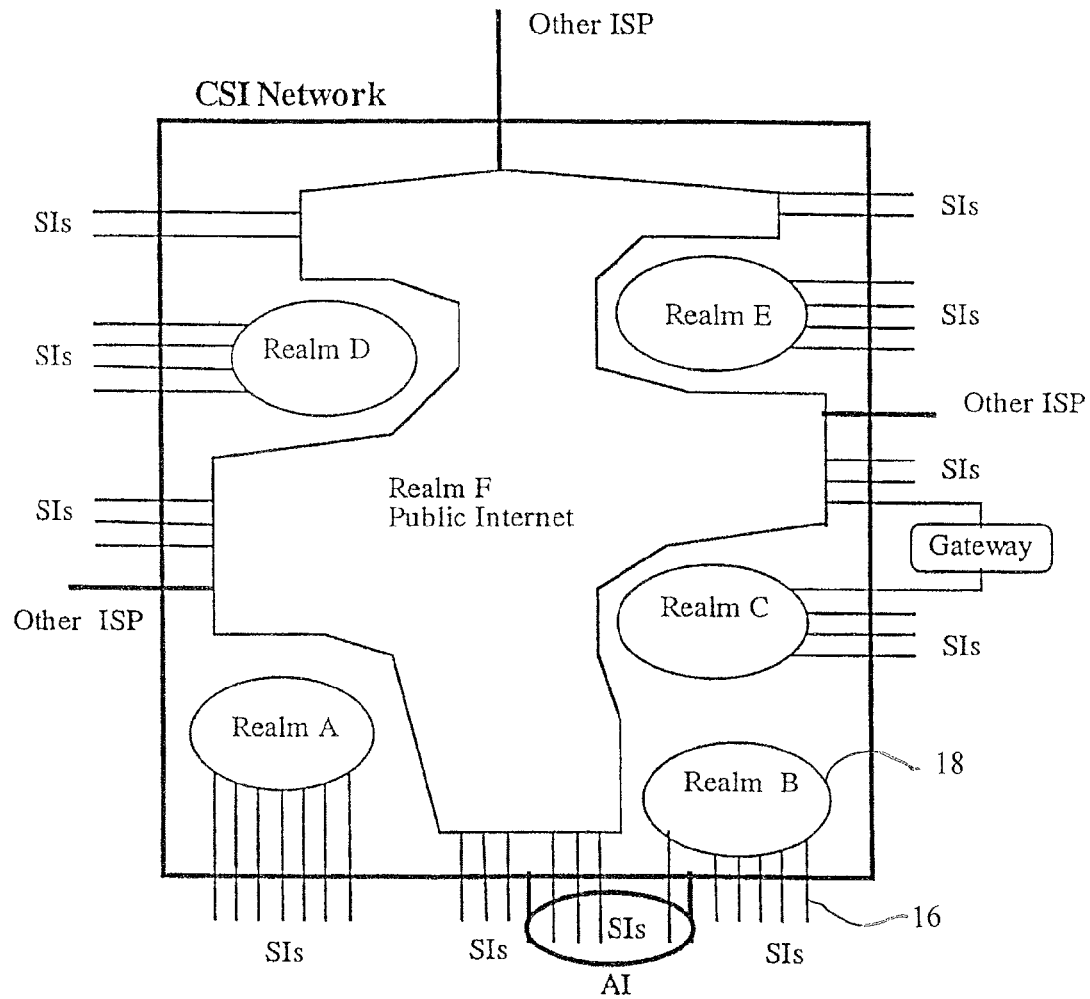
FIG. 1 is a service view of a CSI system.
Figure 2:
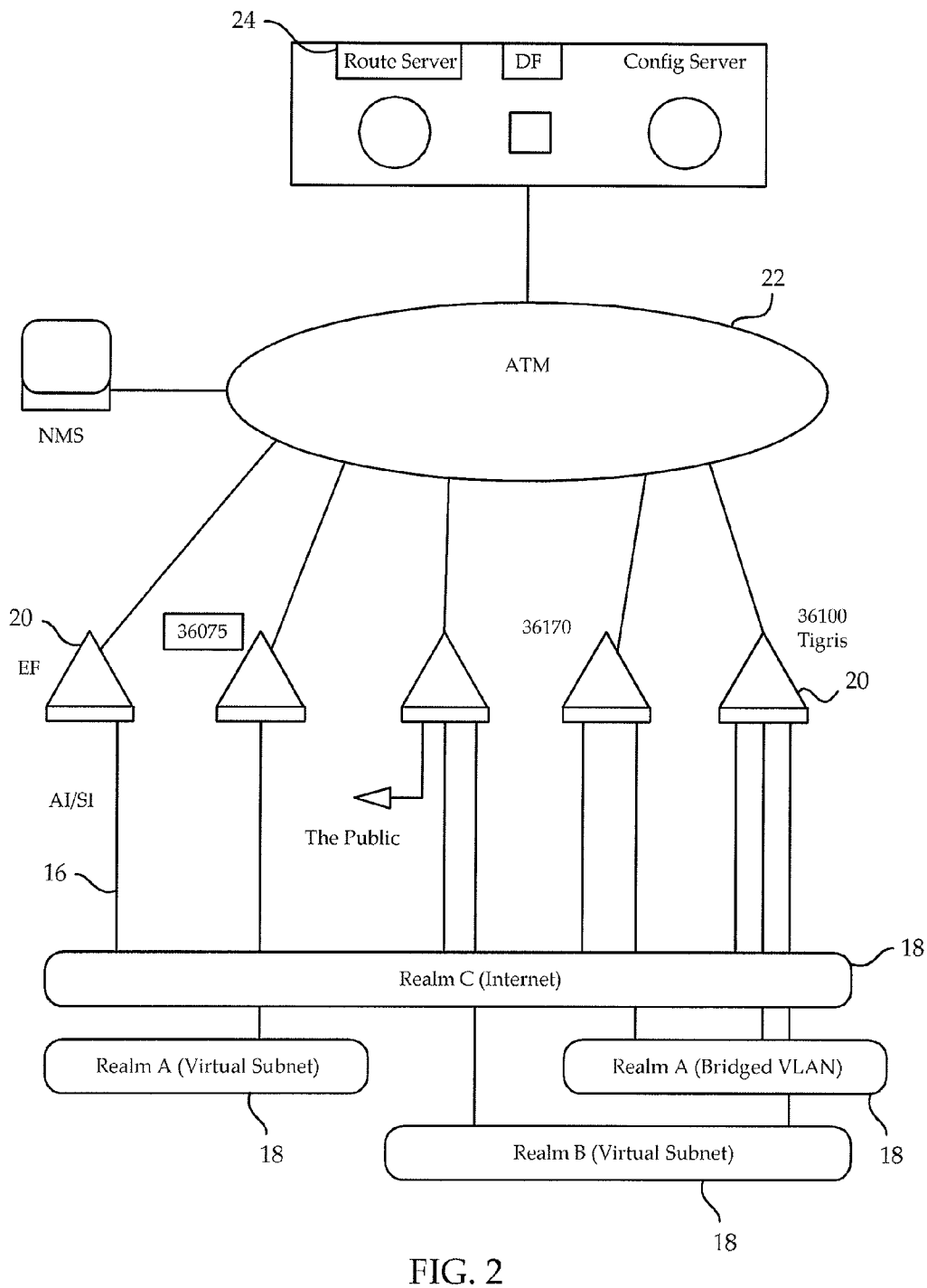
FIG. 2 is a combined service-architectural view of a CSI system.
Figure 3:
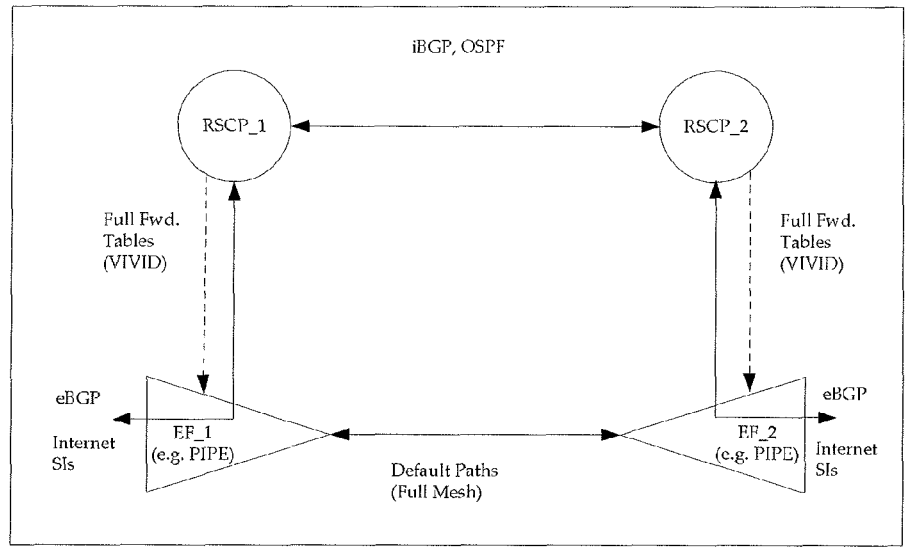
FIG. 3 illustrates control and data traffic for Internet service.

The CSI system description herein makes use of a number of well known and new terms, descriptions of which follow for easy reference. Reference may also be made to FIGS. 1, 2 and 3 for further information on how these terms are related to a CSI system.

Access Interface (AI): An external interface on a CSI system, virtual or physical. See also Management Interface, Configuration Interface, Control Interface, Service Interface and Transport Interface.

Access Termination (AT): A CSI component which provides external access interfaces.

ATM Adaptation Layer 5 (AAL-5): Used for carrying information over ATM.

Anycast Address: A special address used to initiate communications between an end system and any one of a group of others.

Address Resolution Protocol (ARP): A lower-layer mechanism by which a higher layer address can be resolved.

Autonomous System (AS): A collection of network equipment and networks that operate under a common BGP policy.

Border Gateway Protocol (BGP): An IETF standard exterior gateway protocol used to propagate routing information between autonomous systems and between border routers across an autonomous system.

Carrier Scale Internetworking (CSI): A solution framework for carrying packet-based traffic in a highly flexible, scaleable, and manageable way.

Configuration Interface: An interface between a CSI routing or forwarding component and a CSI configuration server.

Configuration Server (CONS): A CSI component which provides configuration services to routing and forwarding components, especially the bindings between them.

Control Interface: An interface between a CSI routing component and a forwarding component.

Core Forwarder (CF): A CSI forwarding component which has no access or service interfaces.

Default Forwarder (DF): A CSI component responsible for making a forwarding decision when an edge forwarder in a private CSI realm has no specific forwarding entry for a particular packet.

Dynamic Host Discovery Protocol (DHCP): See RFC 2131, Droms, R., "Dynamic Host Configuration Protocol", March 1997.

Edge Forwarder (EF): A CSI forwarding component which has service interfaces, by which traffic from outside a CSI system may enter the system.

Border Gateway Protocol-External (eBGP): The portion of BGP that propagates routing information between autonomous systems Border Gateway Protocol-Internal (iBGP): The portion of BGP that propagates routing information within an autonomous system.

Interior Gateway Protocol (IGP): See RFC1812, Baker, Fred, "Requirements for IP Version 4 Routers", June 1995.

Logical Router (LR): An RSI and its client forwarders, taken as a functional unit.

Logical Link Control (LLC): A protocol layer directly above the MAC layer that is responsible for providing logical interfaces between two adjacent layers. See IEEE 802.2.

Media Access Control (MAC): A sublayer of the data link layer defined in IEEE 802.2.

Management Interface: An interface between a CSI component and network management.

Next Hop Resolution Protocol (NHRP): An IETF protocol for finding shortcuts across non-broadcast multiple access networks.

Non-transit Forwarder: A CSI forwarder which is not capable of forwarding traffic between two transport interfaces. See also Transit Forwarder.

Open Shortest Path First (OSPF): An IETF standard link-state interior gateway protocol. See RFC 2178 and draft-ietf-ospf-vers2-03.txt.

Protocol Data Unit (PDU): A unit of transmission. In CSI, either an IP packet or an IEEE 802 frame.

Point-to-Point Protocol (PPP): An IETF standard for encapsulation and negotiation over synchronous and asynchronous point-to-point connections.

Permanent Virtual Circuit (PVC): A virtual circuit that is established through configuration.

Quality of Service (QoS) : A description of a distinct service which may be provided to specific traffic.

Realm: A specific instance of a CSI Service.

Routing Services: The set of functions which provide path discovery, route computation and topology management within the CSI system.

Routing Service Instance (RSI): An individual instance of routing services. The representation of routing services with which forwarders and other routing entities establish associations.

Routing Services Control Point (RSCP): A CSI component which provides routing services.

Service: A suite of protocols supported across one or more CSI access interfaces, together with a coherent set of rules for processing the results of those protocols and user data received and transmitted across those interfaces.

Service Interface (SI): An interface between a CSI edge forwarder and a CSI access termination.

Service Point: A CSI device providing at least edge forwarder functions, and perhaps other functions as well.

Switched Virtual Circuit (SVC) : A virtual circuit that is established through signaling.

Transport Interface: An interface between two CSI forwarding components over which user traffic is carried.

Virtual Circuit (VC): A communications channel that provides for the sequential transport of ATM cells.

Virtual Channel Connection (VCC) A virtual connection that has end-to-end significance and is a concatenation of the virtual channel links that extends between the points where the ATM service users access the ATM layer.

Virtual Private Network (VPN): An intranet network that connects multiple corporate sites through multiple service interfaces.

Figure 10:
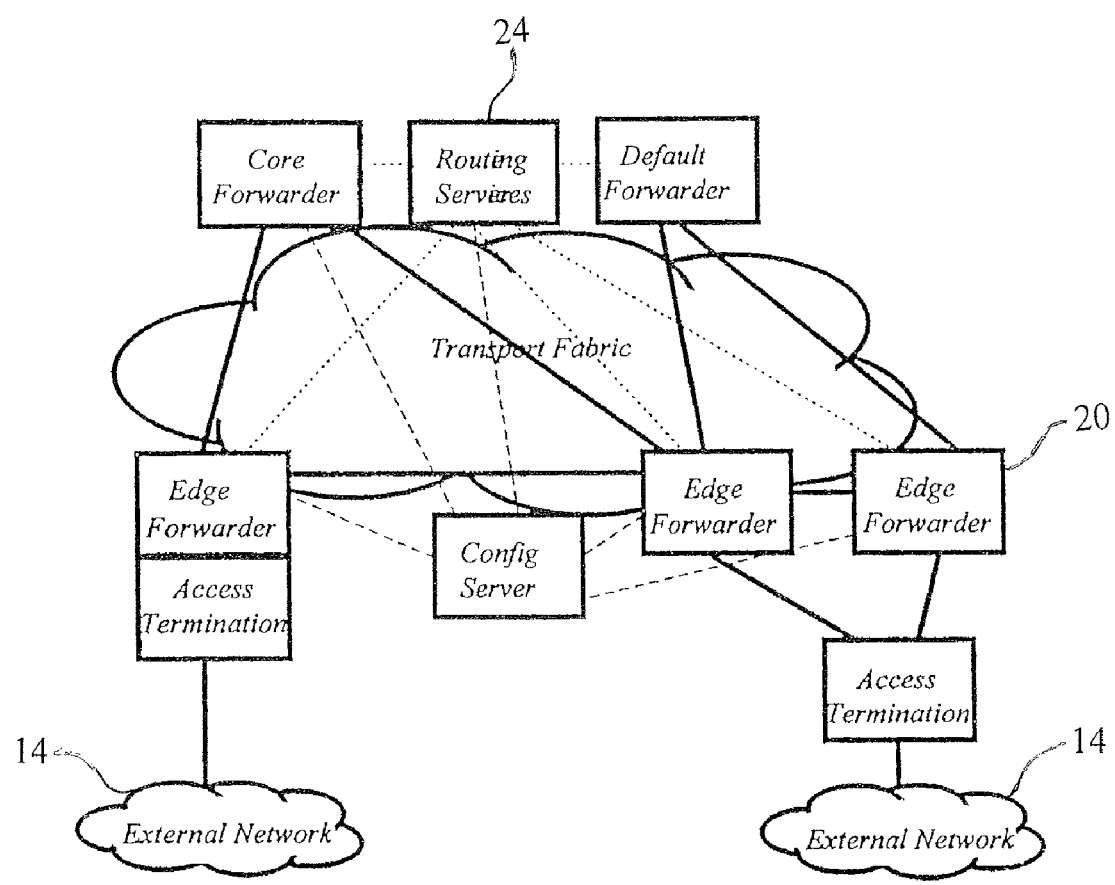
FIG. 10 illustrates various components which in combination constitute a CSI system framework.

FIGS. 1, 2 and 10 provide high level service and architectural views respectively of a CSI system according to the present invention. FIG. 1 shows the concept of multiple, individual realms 18 for Public Internet and virtual private network (VPN) services within a CSI network. FIG. 2 illustrates at a high level the internetworking devices that are logically partitioned into sub-elements and assigned to individual realms. In FIGS. 2 and 10 bridged and/or routed VPN and Internet services are provided to specific network users 14 through separate realms.

As discussed previously, CSI is a distributed system built from collaborating ATM switches, route servers, access terminations, edge forwarders, default forwarders, core forwarders, a management system, and auxiliary servers. As a whole, the CSI system provides internetworking services at both the packet and frame levels. The CSI architecture defines the external interfaces between the CSI system and the outside world and the internal interfaces between CSI components. It is expected that a CSI system will be managed as a whole, by or on behalf of a single service provider.

External interfaces are classified as either access interfaces or service interfaces.

Access interfaces are the interfaces over which one or more service interfaces are provided between the customer and the CSI system (e.g. STM1 UNI or 10 BaseT). Access interfaces interconnect the CSI system and customer access networks, which can be any of various technologies, from a PSTN modem to a campus LAN. The concept of the access interface includes all aspects of the interface which are specific to the particular physical type of the interface as well as any interface-specific transmission protocol issues.

Access interfaces are provided by CSI components known as Access Terminations. Packets transmitted towards (and received from) the access network are encapsulated (and decapsulated) by the access termination components. The access termination devices provide all the control and auxiliary functions required by the access interfaces and transmission across them, e.g. switched-access signaling and Frame Relay local management interface (LMI). Access interface does not refer to a physical interface of the access termination, but rather to a set of functions performed by the access termination. Conceptually the access interface is internal to the access termination.

Service interfaces are logical interfaces through which services are provided to the customers. A service interface is expected to carry traffic for one customer, although a customer may encompass many end systems. The control and user data flows for each service are those appropriate to the service.

Service interfaces 16 are provided by Edge Forwarders 20. Edge forwarders exchange encapsulated, interface-independent Protocol Data Units (PDUs) with the access terminations, and provide all control and auxiliary functions required by higher layer encapsulations and control protocols such as point to point protocol (PPP).

A service is coordinated communication between an access termination and a specific customer across a service interface, using sets of supported protocols and the management of control and user information according to those protocols. Two instances of services available in CSI are:

1) Public Internet access service, which is managed connectivity to the public Internet; and 2) Virtual private network (VPN) service, which is managed connectivity to a virtual private network. A virtual private network may include both virtual local area networks (LANs) (bridged connectivity) and virtual subnets (network layer connectivity).

A realm is a specific instance of an internet or VPN service. Within a VPN realm, there may be multiple virtual LANs each for a different protocol family. A single service interface may support multiple virtual subnet services (within a VPN realm). Different PDUs from a single end. station may be injected into different virtual LANs or virtual subnets.

An access interface may support more than one service interface simultaneously, but a service interface may support only one service at a time, and a service may be provided for only one realm at a time. The particular service and realm available on a particular service interface shall be controlled by configured policy, authentication and authorization.

Mechanisms for providing services and distinguishing realms are discussed later.

One or more route servers 24 may communicate with other routing entities outside of the CSI system, for the exchange of internet routing information. From the point of view of routing, the route servers represent the CSI system to the outside world. This communication takes place at the internet layer, across an access termination or an edge forwarder.

The foundation of a CSI system is an ATM network 22. On this ATM network, CSI coexists with other services that might be offered, such as circuit emulation. In practice, a single ATM network may serve as all of: access network; distribution fabric; and transport fabric. The role of the ATM network is to provide high-speed, complete connectivity between components of a CSI system. All interfaces between the fabric and the components of a CSI system preferably are ATM UNI (User Network Interface) interfaces.

In the CSI system, all packets within a flow of either control or user data are encapsulated using LLC (Logical Link Control) encapsulation. This permits, but does not require, multiple flows to be carried over a single virtual channel connection (VCC). Control and user data flows cannot be carried in the same VCC.

The management system provides all other CSI components with the basic configuration information they need to communicate and to establish bindings between interfaces, services and realms. Configuration information is given to each component when it becomes operational, and may also be updated at any time.

Access Terminations provide access interfaces. On the access network side they terminate data and control planes. On the CSI side of the network they provide a uniform connection mechanism and traffic stream to edge forwarders. Access terminations act as aggregation and distribution points, collecting traffic from access networks to distribute to one or more edge forwarders, and distributing traffic from one or more edge forwarders to one or more access networks. The distribution of traffic is controlled by configuration information.

The primary motivation for separating the access termination functions from the edge forwarding functions is to enable the access resale capability.

Access terminations provide limited service differentiation through traffic prioritization between interfaces. This is done under the control of the management system. Access terminations do not do any filtering or traffic shaping for incoming (i.e. from the access network) traffic.

Edge forwarders terminate service interfaces and provide all functions related to forwarding in the CSI system, for both packets and frames. Edge forwarders are potentially the most sophisticated components in a CSI system.

While access terminations may distinguish between traffic destined to different edge forwarders, edge forwarders are responsible for more sophisticated service differentiation.

Edge forwarders receive encapsulated PDUs from access terminations and other forwarders, examine them according to rules given by the management system, categorize them, manipulate them as necessary, and forward them using rules appropriate for the realm in which the PDUs are placed. The processing rules may lead to forwarding of either bridged frames or routed packets, in private or public nets, on a per-PDU basis.

Where the control plane of a service interface includes authentication, for example with PPP, the edge forwarder will perform preliminary authentication of users, since this may affect the distribution of traffic. Edge forwarders also provide all other functions ancillary to higher layer protocols, such as support for proxy ARP (Address Resolution Protocol) and inverse ARP, and may act as a proxy for some services such as DHCP (Dynamic Host Configuration Protocol) They may make use of other resources, such as route servers, to perform these functions. Edge forwarders represent the CSI system at the internet level, for example by responding to IP-based echo requests.

Edge forwarders inform route servers of all changes in topology concerning links to access terminations and configured links to other forwarders. Edge forwarders differentiate between flows and provide differential queuing services for flows where configured. Edge forwarders may also detect flows and create "shortcut" VCCs to other forwarders where appropriate, when allowed by configuration.

A core forwarder is a low overhead, low functionality, possibly high speed internet-level forwarding device in the core of the CSI network, for use only by public internet services. Core forwarders are not necessary to the functioning of a CSI system, and are provided to support scalability (by making it possible to reduce the number of VCCs between edge forwarders and by offering a default forwarding path for forwarders which cannot hold full forwarding databases). A core forwarder has no direct service interfaces and runs no routing protocols. Special features, where necessary, should be implemented in the edge forwarders and access terminations, thus allowing the core forwarder to support high speed and high capacity without high overhead. Although some end-to-end features (e.g. in Resource Reservation Protocol {RSVP} and Integrated Services) require support in all forwarders, in the core forwarder speed and capacity are far more important than feature richness.

A default forwarder is essentially a more intelligent core forwarder, used in support of private realms. In private realms, edge forwarders may not have complete forwarding information. Rather than drop packets/frames while they are retrieving this information (from route servers) they forward them to the default forwarder. The default forwarder is more sophisticated than a core forwarder, in that it must take VPN policy information into account when deciding how to forward.

In the cases of both packets and frames, route servers are responsible for routing, while forwarders are responsible for forwarding. The functions of routing are explicitly separated from the functions of forwarding, in order to make it possible for individual components to do each more efficiently. Route servers are not in any user data path, and are not responsible for forwarding any user data.

Route servers are responsible for:
providing forwarders with service-related configuration information and interface bindings, and updating this information as necessary;
exchanging routing information with internal and external routing agents;
gathering information internally to keep track of internal topology;
computing forwarding databases as needed from the above information and from configured policy;
disseminating these databases to the edge and core forwarders (full tables in the public internet case; partial, full, or on-demand for private services); and answering queries in support of other functions the forwarders may perform such as ARP.

Auxiliary servers provide support for services which run at a higher layer but are considered fundamental to normal network use. Such services are beyond the scope of the CSI architecture, but support for their functioning across the CSI system is not. In some cases, the auxiliary server may not be directly associated with the CSI system, or even if it is part of the system, it may not be user-visible. This category does not include "content" servers such as NetNews, web servers, electronic mail, or user directory Services.

Interfaces between CSI components support both control and user information. Interfaces occur over either "persistent" or "non-persistent" ATM SVCs. Persistent SVCs (SVC-Switched Virtual Circuit) are established per configuration, are maintained regardless of inactivity, and are re-established in the case of failure. Non-persistent SVCs are established only as needed and are released on inactivity. The particular definition of "inactivity" is a matter for local policy, and may be part of the information obtained from the management system.

A flow of either control or user information is carried in a single VCC. Multiple flows may be carried in a single VCC, but control flows are separate from user information flows. All configured control flows within the CSI system take place over persistent SVCs. User data flows used to provide default connectivity—that is, flows established based on configuration information and not on observed behavior of traffic or other criteria—are also carried over persistent SVCs. All other flows are carried over non-persistent SVCs.

In all cases, when a VCC is set up, ATM signaling is used to indicate the particular realm the VCC is being set up for. ATM signaling may also be used to indicate that a VCC is to be used for multiple realms, using B-LLI, B-HLI, and/or L2TP.

Each component has, as part of its basic configuration, one or more anycast ATM addresses for contacting the management system. The first connection a component establishes is with the management system over a persistent SVC. In the usual case, the management system then gives the component the information it needs to establish other default connections, and to know how to use them. These "default forwarding" connections are then established and maintained.

Specifics of internal interfaces follow. Every component maintains a persistent connection to the management system. In the usual case, the management system then passes configuration information to the component which the component needs in its specific situation. This policy information may include Access interfaces and service interfaces to be enabled and ATM addresses and other necessary information for establishing connections with other components. Other components may include edge forwarders, core forwarders (for all but access terminations), access terminations (for edge forwarders), and default forwarders and route servers (for all but access terminations).

Access terminations are given rules to use in determining how incoming traffic should be processed and forwarded.

However, such information is not given to forwarders for their service interfaces—they obtain that information from their route servers.

The management system may update a component's configuration information at any time using the interface provided by the persistent VCC.

Components may have information configured statically. Although they must connect to the management system, there is no requirement that they receive their policy information from the management system. CSI system managers may trade off the ease of central configuration management for the sake of simplicity and robustness. Hybrid schemes are possible where management information is statically configured into a component, but can be overridden by dynamically downloaded information.

An access termination examines incoming traffic and redistributes it to one or more edge forwarders in one or more VCCs, according to configured policy. An access termination interacts only with the management system and with one or more edge forwarders.

An access termination may bypass nearby edge forwarders and use VCCs to remote edge forwarders. This practice is known as access resale, and allows the CSI system operator to deliver traffic transparently from an access termination in one location to an edge forwarder in another location, for example to an interface to an Internet service provider.

In large-scale environments, in order to reduce the number of VCs from access terminations to edge forwarders, access terminations should support Layer 2 Tunneling Protocol (L2TP) directly over ATM Adaptation Layer 5 (AAL5) or some other scaling mechanism. Flows with different service requirements will be carried in different L2TP tunnels.

There is no direct communication between Access Terminations. All traffic from an access termination which flows into the CSI system must flow to an edge forwarder.

A particular implementation of an access termination may allow traffic to make "hairpin turns," entering on one service interface and exiting immediately on another. Such implementations must take policy configuration into consideration. Configured policy may affect such traffic in two ways: first, with regard to the legality of the traffic flow, and second, differentiation of service.

Edge and core forwarders are responsible for establishing persistent connections to those route servers dictated by their configuration.

Route servers provide forwarders with configuration information related to service interfaces, including bindings between service interfaces and particular realms. Route servers obtain reachability information from two sources: external routing entities (in peer networks and customer networks) and from edge and core forwarders. The route servers obtain external reachability information through the use of standard routing protocols (Border Gateway Protocol version 4 (BGP-4) for external providers; Routing Information Protocol version 2 (RIPv2), Open Shortest Path First version 2 (OSPPv2) or BGP-4 for customer networks).

Edge forwarders send internal connectivity information (including information they obtain from access terminations) to the route servers using OSPFv2. Only topological connectivity information is sent, not information about reachable destinations. Also, ad hoc shortcut VCCs are not advertised. Finally access terminations do not appear in this topological information.

The route servers use the routing information from external sources, topology information from the forwarders, and policy information from the management system, to compute forwarding rules for each forwarder in the CSI system for which they are responsible. They then download this forwarding information to the forwarders. As a given forwarder may participate in multiple realms, forwarding information includes at least incoming service interface, PDU characteristics such as source and destination addresses, output service interface and output queuing regime.

Route servers are also responsible for computing multicast forwarding rules for the forwarders, for use within and between realms. Multicast within bridged realms is managed following the usual mechanisms for VLANs. Since unicast forwarding rules may already include information such as incoming interface and source address, no new protocol features are required to support distribution of multicast forwarding information to the forwarders. Multicast join and leave requests are sent from the forwarders to the route servers, which then distribute the appropriate forwarding rules in response.

Finally, edge forwarders may query route servers to resolve from Media Access Control (MAC) or internetworking addresses to ATM addresses in the case of VPN traffic (both bridged and routed). Route servers establish connections to other route servers according to configuration. Route servers use internal Border Gateway Protocol version 4 (iBGP4) to communicate external reachability information to each other. The BGP Next-Hop attribute is used to distribute the ATM address of the appropriate Edge Forwarder for external-routes. This is required because the route servers may be physically separate from the forwarders.

Route servers use OSPFv2 to communicate internal topology information among themselves. Only information about configured connections is distributed between route servers. Information about dynamic, "shortcut" connections is never propagated. Route Servers may propagate Next Hop Resolution Protocol (NHRP) and MAC-layer address resolution queries to the next Route Server along the "default" path to the destination within that particular realm.

Given the forwarding tables delivered from the route servers, the edge and core forwarders forward IP packets as required by "Router Requirements"; this includes generating Internet Control Message Protocol (ICMP) messages as required. The Forwarders also respond to ICMP Echo Messages. Further, for packets received from a customer network, the Edge Forwarders may verify that the source address is valid for the network from which the packet was received.

Edge forwarders establish connections with each other for two reasons. First, if configured to do so for a particular realm, and second, if a flow is detected and the edge forwarder considers a direct "shortcut" connection to be appropriate. In the case of a configured connection, either edge forwarder may attempt to open the connection.

Edge forwarders communicate with each other using protocols appropriate to the type of realm being supported. All packets or frames are encapsulated as required by the fabric. Data transferred as part of a routed realm are transferred as encapsulated internetworking level packets while data transferred as part of a bridged service are transferred as MAC frames.

Shortcut connections are direct SVC connections between two Edge Forwarders, for flows which are high-volume or require specified Quality of Service (QoS) or other segregated handling. Shortcuts are established by the edge forwarders as a result of flow detection policies or administrative control. The decision of when a flow has been detected for which a shortcut connection is useful is an implementation issue.

Core forwarders forward between each other as dictated by configuration and by downloaded forwarding databases. Core forwarders do not exchange routing information, do not detect flows, and do not create dynamic "shortcut" SVCs.

In the Example shown in FIG. 3, the following interfaces and protocols are required to support public Internet services: Both Route Server Control Point (RSCP_1) and RSCP_2 support Internet routing (eBGP; iBGP and OSPF). NHRP is run on both RSCP_1 and RSCP_2 (server-server) to support EF-to-EF shortcuts as described below.

Both EF_1 and EF_2 support service interfaces to Internet customers. Full forwarding tables are downloaded from RSCP_1 to EF_1 and RSCP_2 to EF_2 via the Table Download protocol.

Figure 4:
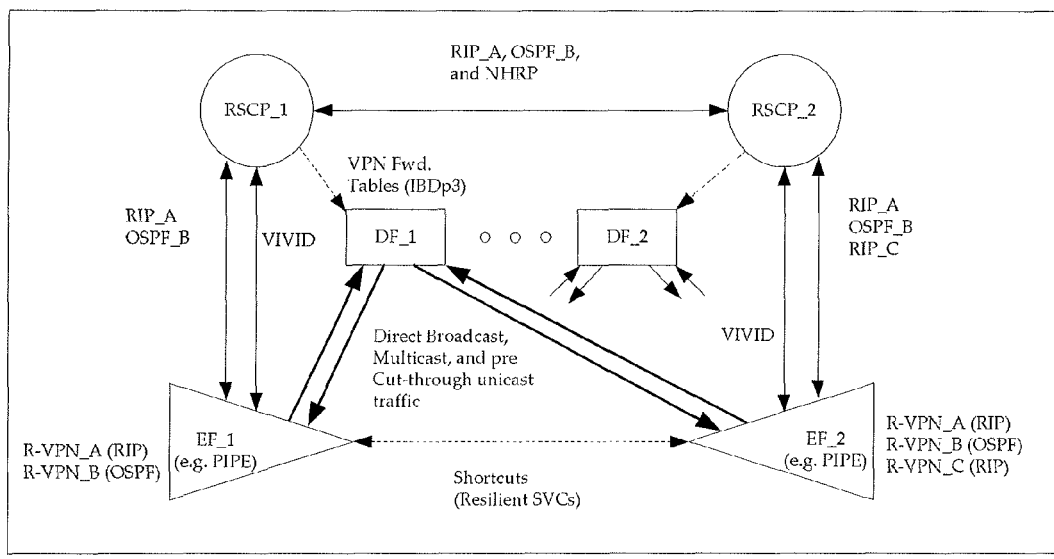
FIG. 4 illustrates control and data traffic for a virtual private network (VPN)

Shortcut data paths for higher CoS may be established for Internet services between EF_1 and EF_2 based on administration control or configured policies in the EFs. A client is run in the EFs to perform address resolutions. In the example of FIG. 4, the following interfaces and protocols are required to support Virtual Subnet services: EF_1 supports R-VPN_A Service Interfaces using RIP as the routing protocol and VPN-B Service Interfaces with OSPF as the routing protocol. EF_2 supports R-VPN_A and R-VPN C running RIP and R-VPN B running OSPF.

For VPN_A, an instance of RIP will run between RSCP_1 and EF_1 VPN_A attached devices and similarly between RSCP_2 and EF_2 VPN_A attached devices. For full reachability, an instant of RIP associated with VPN_A operates between RSCP_1 and RSCP_2.

For VPN_B, an instance of OSPF will run between RSCP_1 and EF_1 VPN_B attached devices and an instant of OSPF between RSCP_2 and EF_2 VPN_B attached devices. To fully manage VPN_B across the two RSCPs, an instant of OSPF associated with VPN_B is run between RSCP_1 and RSCP_2.

For VPN_C, an instance of RIP will run between RSCP_2 and EF_2 VPN_C attached devices.

Shortcut data paths are established between EF_1 and EF_2 for all Unicast data traffic. A client is run in the EFs to perform address resolutions for shortcuts via the RSCPs. NHRP is run on both RSCP_1 and RSCP_2 to support EF-to-EF shortcuts. EFs maintain a cache of most frequent connections (to minimize EF-RSCP activity) and connections are based on resilient SVCs (to minimize SVC setup/tear-down).

Directed broadcast and multicast traffic is forwarded to the RSCP's internal DF as shown in FIG. 4. Using direct point to multipoint (p-to-mp) connections the DF is responsible for forwarding the traffic to the egress EFs. The internal DF is also used for providing unicast forwarding for VPNs during the detection and set-up time of short-cut connections (SVC).

Figure 5:
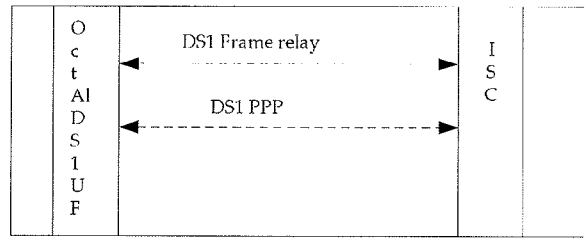
FIG. 5 shows one implementation of a Packet Internetworking Processing Engine (PIPE) also known as an Internetworking Service Card (ISC) on a multi-services switch such as a Newbridge 36170.

The Packet Internetworking Processing Engine (PIPE) also known as the Internetworking Services Card (ISC) provides a high-fanout Edge Forwarder as a Universal Card Slot (UCS) card on a multi-services switch such as a Newbridge Networks 36170. This engine is used to forward IP traffic delivered to the system on Frame Relay (FR), PPP or ATM interfaces (see FIG. 5). In the case of FR or PPP traffic, the sessions must first traverse a Frame Relay card in the 36170, however this card can be in a different shelf or system from the PIPE.

The PIPE (ISC) provides the following instructions:
a) automatic download of configuration information from the Configuration Server,
b) initiation of SVCs as required to provide connectivity,
c) termination of PPP sessions and FR connections,
d) support for a number of independent forwarding contexts where total forwarding entries per PIPE is limited,
e) obtains forwarding information from a Route server,
f) packet classification and output queue selection in support of system-level traffic management policing,
g) transparent bridging in support of the Bridged VPN service,
h) IP unicast and multicast forwarding in support of the VPN and Public Internet services, and
i) N+1 redundancy The ATM fabric provides interconnection of the CSI components for both control and user-data traffic. As shown in FIG. 2, each component of the CSI System is connected to the ATM fabric; connectivity between components uses ATM Virtual Channel Connections (VCCs).

Most inter-component SVCs are "resilient, long hold time" SVCs, i.e. they are (re)established on component restart. On-demand SVCs are only used to provide shortcuts for the VPN service. The "resilient" nature of the SVCs indicates that the component that originally initiated a SVC will persistently attempt to re-establish the SVC if it is ever cleared by the network. The interval between such re-establishment attempts is subject to an exponential backoff. The generation of SVC setups by a component is rate-limited.

There are three primary categories of inter-component connectivity; these are described in the sections that follow.

The CSI System uses three set of VCCs for connectivity in the control plane:
a) from an Edge Forwarder to the Configuration Server for configuration information download
b) from the Edge Forwarder to the Route Server for basic control function and on-demand address resolution for VPN services; and
c) from the Route Server to all of the Edge Forwarders for distribution of broadcast and multicast.

A unicast SVC is established from the Edge Forwarder to the RS/CS for registration and cache management. The RS/CS then establishes a LAN Control SVC back to the Edge Forwarder over which configuration is downloaded with guaranteed delivery. The RS/CS also adds the Edge Forwarder as a leaf of P2MP SVCs, one for each VPN.

Traffic descriptors for all types of connections, except the RS SVCs, are configurable. The non-service interface connections are only configurable on a per-category per-realm basis.

Each Edge Forwarder obtains from the Configuration Server the ATM addresses of all Edge Forwarders involved in Public Internet traffic forwarding, or of a Core Forwarder, to which it maintains ATM connectivity. The Edge Forwarder maintains a VCC to each Edge Forwarder and/or Core Forwarder for each class of service; this VCC is established upon restart and/or (re)configuration. Each Edge Forwarder obtains from the Configuration Server the ATM address of at least one Default Forwarder to which it maintains ATM connectivity. The Configuration information supplied by the Configuration Server results from the configuration of the system.

In addition to the base connectivity, an Edge Forwarder will set up a new short-cut VCC or re-use an existing shortcut VCC when it detects a flow that requires a class of service for which there is no short-cut VCC. Short-cut VCCs are disestablished, using a distinct clearing cause, when the VCC has been idle for some period of time.

Traffic Management is handled independently on a per-connection basis. There are two major types of connections in CSI, Service Interfaces and the set of SVCs comprising the CSI Core. Each connection needs the standard ATM Traffic Descriptor plus additional parameters comprising the packet-level traffic information. Note that control and routing traffic gets priority over the data traffic.

Figure 6:
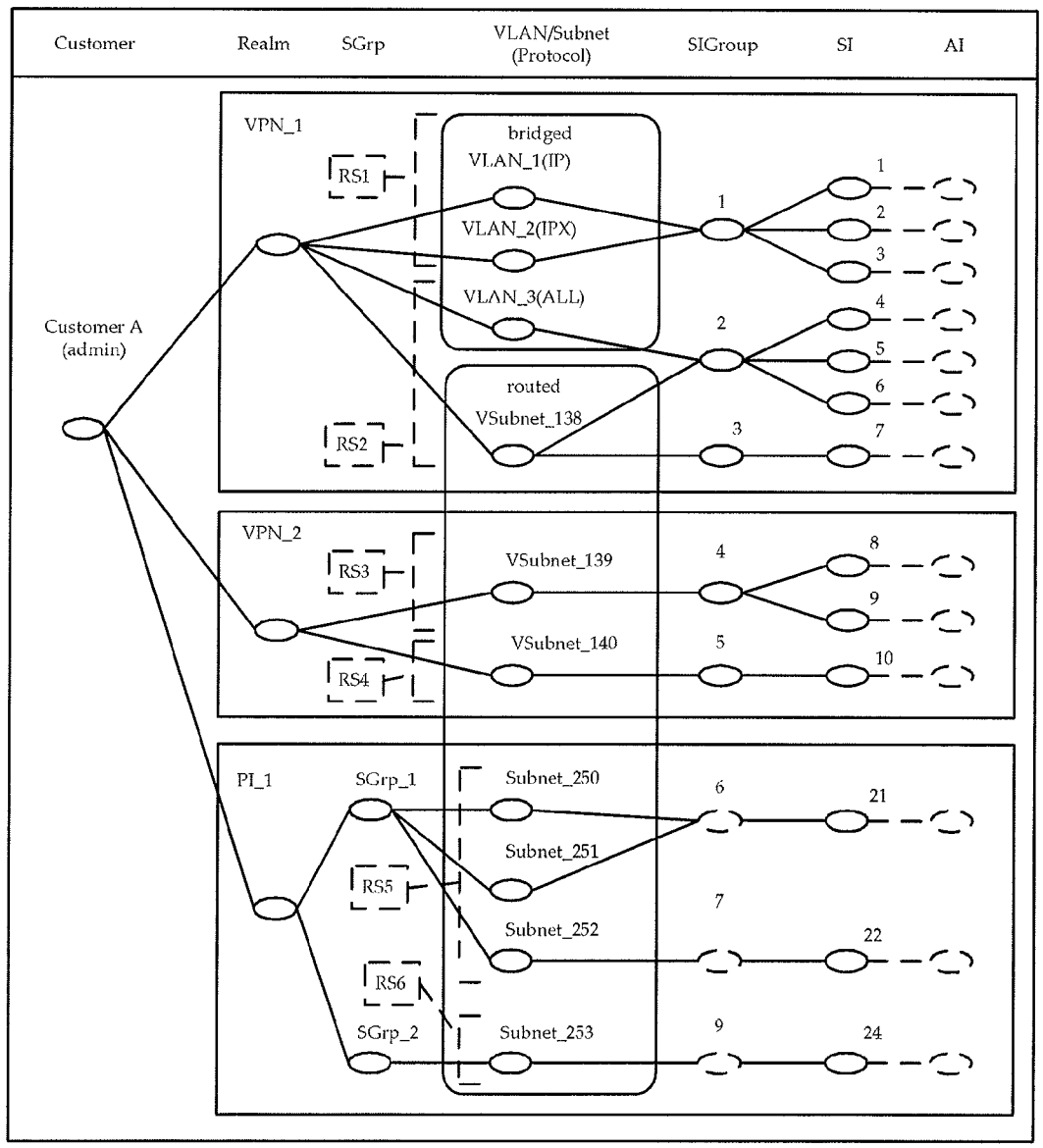
FIG. 6 illustrates a CSI management model.

FIG. 6 is an illustration of the CSI management model. As this figure shows, customers can have one or more realms. Each realm will have a type associated with it, one of bridged and/or routed VPN or public Internet. A bridged realm can have one or more VLANs associated with it. A VPN supports one or more bridging and/or routing. Bridging is supported through the use of virtual LANs and routing support uses virtual subnets.

In addition to the common features listed above, the following features are provided for the Public Internet service:
i) The CSI system uses External BGP (eBGP) to exchange routing information with peers.
ii) The CSI system can use iBGP, eBGP, OSPF or RIPv2 to exchange routing information with customers; alternatively it can use static information about what is reachable on the customer end of a service interface.
iii) The CSI system uses Internal BGP (iBGP) to synchronize the externally-obtained reachability across the Route Servers.
iv) The CSI system uses OSPF and/or static routes to manage the internal topology, i.e. the pre-defined reachability between Edge Forwarders, of the components that support the Public Internet Service.
v) The CSI system combines both the internal and external topology information while building the forwarding table.
vi) Support for multiple autonomous systems within a single Public Internet service.
vii) Unnumbered interfaces are supported.

The PIPE is used within 36170 networks as an element of the Carrier Scale Internetworking System. The primary function of the PIPE is to provide packet internetworking (layer 3+) service boundary for a wide range of low to medium speed 36170 access interfaces The Packet Internetworking Processing Engine provides the following primary functions:
F1: UCS behavior
F2: Virtual Connection support
F3: Packet forwarding
F4: PPP/ATM link termination
F5: 802.1(d) Spanning Tree Protocol (STP)
F6: Realm identity & network address assignment
F7: "MPOA" client Within the CSI system the PIPE provides the routed (layer 3) and bridged (layer 2) forwarding services for various physical Access Interfaces across a range of 36170 packet and cell interface cards. Together the PIPE and its associated Access Interfaces create a high fan-out Edge Forwarder. The two network elements described in detail herein are the PIPE card and the Access Termination/Access Interfaces as provided by the various packet and cell cards.

Figure 7:
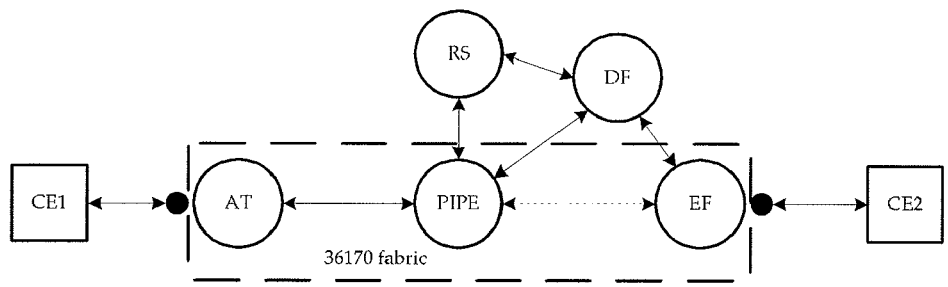
FIG. 7 is a diagram of traffic and control flow to and from a PIPE.

The CSI system is designed to give a network operator facilities to provide a range of internetworking services to customers. FIG. 7 provides a simplified schematic diagram of the flows of traffic and control data to and from the PIPE. The two boxes at the left and right represent Customer Equipment (CE1 and CE2) that require internetworking connectivity. Typically these boxes are routers and/or bridges with some form of WAN interface which would be connected into the CSI system.

In a simple application CE1, might be a router with: an Ethernet interface servicing a customer LAN; and a T1 interface providing the connection into the CSI system. The Access Termination (AT) on the 36170 would be a T1 port on a UFR card. There are two internetworking packet encapsulations which can be supported in this case. The first is Frame Relay and the second is PPP. In both cases the UFR card provides an Access Interface onto an ATM VC which connects to the PIPE across the 36170 ATM fabric. In both cases the PIPE provides all the necessary functions to process the encapsulations and forward the internetworking packets flowing to and from CE1.

The Route Server (RS) provides the control information about forwarding so the PIPE can select the correct paths for delivering packets. The Default Forwarder (DF) and Edge Forwarder (EF) elements together provide the internetworking path between the PIPE and CE2. The EF element could be either another PIPE/AT pair, a Ridge, etc. In the simple case packets will flow to and from CE1, though a path that goes from the PIPE up to the DF and on through the EF to CE2. When it has been determined either automatically or through configuration that traffic between CE1, and CE2 (or more correctly traffic between the PIPE and the EF) is significant enough to require a more direct path a "short-cut" connection is established directly between the PIPE and EF. Once the "short-cut" is set up traffic between CE1, and CE2 will flow over the "short-cut" bypassing the DF.

In the "Public Internet" service case the connection providing the direct path between the PIPE and EF is configured administratively as a fixed link. This connection is established within the system at initialization when the component element involved reaches the full operational state and is maintained continuously.

Figure 8:
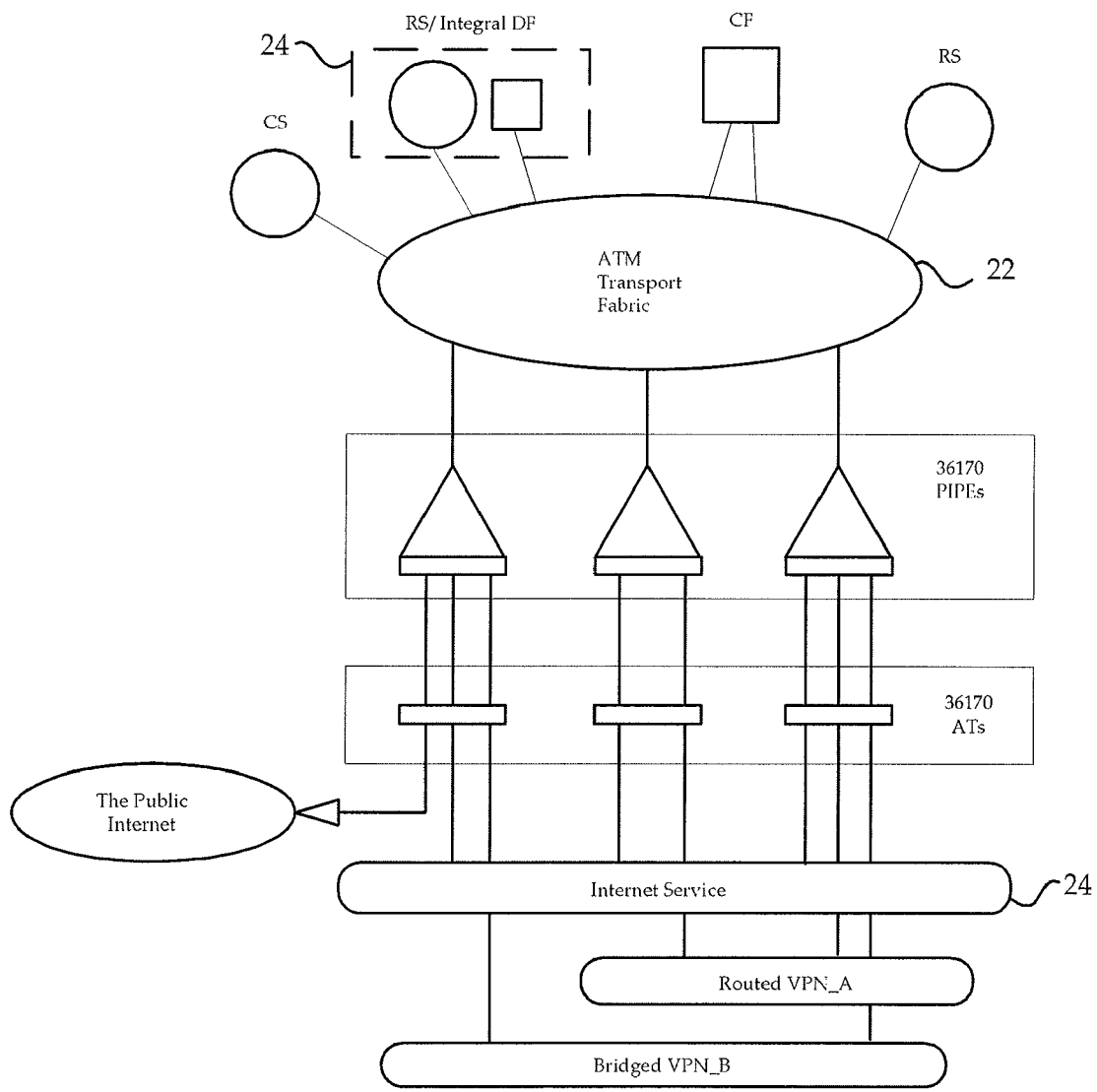
FIG. 8 illustrates a simplified CSI system.

FIG. 8 provides a more complete picture of a small but typical system, showing the relationships between various elements of the CSI application. There are a few elements, the Configuration Server (CS) and the Core Forwarder (CF), added that complete the system along with a few PIPEs, ATs and RSs illustrating the modular nature of the CSI system. The CS provides the PIPEs and other elements in the system with the details about connections and other parameters necessary to bring the system to an operational state. The CF provides a function similar to the default forwarder in networks where the traffic characteristics require very high capacity default forwarding paths, e.g. services providing access to the Public Internet.

FIG. 8 also illustrates how a small but typical CSI system could be used by a network operator to provide a mix of services to various customers while maintaining necessary partitioning of control information and traffic load.

The PIPE does not provide any external physical ports, consequently ports are not physical but are simply implementation abstractions.

The Enhanced Processing Engine Card (EPEC) card hosting the PIPE card can be reset through system software as a maintenance function or mode reconfiguration from Node Management Terminal Interface (NMTI). Software resets will tear down all active circuits and PPP connections immediately.

The PIPE has its primary physical attachment to the network fabric via the ATM interface to the 36170 backplane. Connections into the PIPE for the various functions detailed below are provided via PVCs, SVCs and SPVCs.

Aggregates to the CSI core are supported on conventional multiprotocol VC terminations and are either statically assigned or dynamically bound SVCs using the "MPOA" client function (F7). Frame Relay, PPP or ATM circuits providing network layer encapsulation services are terminated on the PIPE as PVCs or SPVCs, using this same termination function, via the FRF.8 Inter-Working Unit on the various supported 36170 frame relay interface cards. PPP packets are transferred between the PIPE and the supported 36170 interface cards using PVCs or SPVCs over a PPP/ATM transparent HDLC encapsulation.

The following table shows all of the connection types supported on the PIPE:

| Connection Types supported by the PIPE | | | | |
|---|---|---|---|---|
| Connection Type | Supported Cards | PVCs | SPVCs | SVCs |
| Frame Relay Service Interfaces | All Frame Relay Cards | Yes | Yes* | No |
| ATM Service Interfaces | All Cell Relay Cards | Yes | Yes | No |
| PPP Service Interfaces | All Frame Relay Cards | Yes | Yes* | No |
| PPP over FR Service Interfaces | All Frame Relay Cards | Yes | Yes* | No |
| PPP over ATM Service Interfaces | All Cell Relay Cards | Yes | Yes | No |
| Short-cut Paths between Edge Forwarders | All Cell Relay Cards | No | No | Yes |
| Fixed Link Paths between Edge Forwarders | All Cell Relay Cards | No | No | Yes |
| Control Connections to Route and Config Servers | All Cell Relay Cards | No | No | Yes |

*This is only supported if all NNI Cards are Cell Relay. Frame Relay and PPP SPVCs are only supported over the Cell Relay SVC Infrastructure in this release.

Several SVC connections must be maintained continuously to provide proper functioning of the CSI system. If one of these persistent connections is released, a call attempt is made, again to the same destination address or, if more than one destination address is available, the full set of possible destinations. The call attempts are made with an exponential backoff on failure with the initial time between attempts starting at a base interval (e.g. 1 second), after 8 attempts it does not increase further (e.g. starting at 1 second the final backoff interval will be just over a minute—64 seconds) but the PIPE may continue to attempt the call indefinitely. The behavior if the 8th and final attempt fails is particular to the type of connection, some will persist indefinitely and others will stop at the 8th attempt and raise an alarm. The PIPE is responsible for determining if any information preserved over the reconnect has changed during the outage and reacting to these changes.

Transport services and applications above IP (and other best-effort layer 3 protocols) are sensitive to cell loss, and the upper-layer windowing protocols will tend to drive loads to the threshold of congestion for the network, however, early packet discard (EPD) schemes are available which reduce the effect of congestion in the ATM fabric and provide improved feedback to properly behaving windowing mechanisms. A simple form of ATM traffic shaping is performed on the PIPE on a per-VC basis for traffic toward the backplane. Traffic Policing is unnecessary for the PIPE as it is a trusted UNI device. The operator can define the traffic contracts for specific categories of VCs initiated from the PIPE. These categories are:
1) Connections to the Configuration Servers;
2) Connections to the Route Servers; and
3) Short-cut connections to other Access Forwarders.

The service interface traffic parameters can be any valid selection as specified in traffic management. It is intended that a network management platform will support a profile mechanism for service interfaces. This reduces the amount of configuration required for each service interface. This is solely a management construct. Each service interface at the PIPE is controllable separately.

The PIPE implements services within ATM AAL5 encapsulation which are compatible with the multiprotocol LLC/SNAP encapsulation. This provides IP/ATM, transparent bridging over ATM and PPP/ATM functions. This is used to provide two features within the CSI System. The first is to provide the termination for connections provided on the Access Interfaces of the CSI system including: access over native ATM services; internetworking with external Frame Relay attached network layer devices via the FRF.8 service IWU; and PPP attached devices as provided on the various 36170 FR interface cards.

The second is to provide the connectivity over short-cuts and statically configured VC paths across the core fabric to other networking elements in the CSI System.

Figure 9:
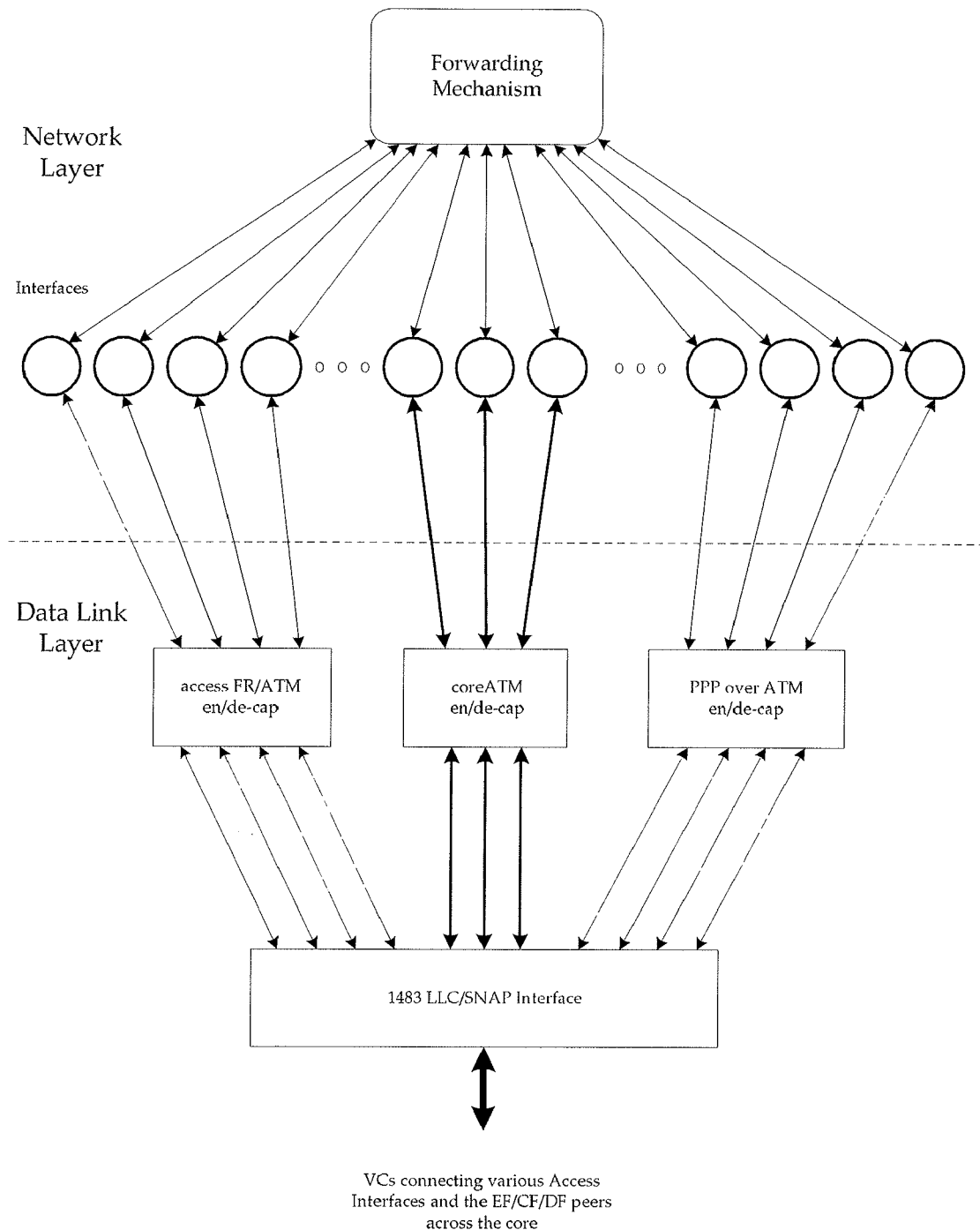
FIG. 9 shows a network layer forwarding mechanism.

The basic network layer forwarding mechanism is common to both bridged and routed networks. The model for this mechanism is illustrated in FIG. 9.

The PIPE nominally supports a maximum number of realms. The realms on the PIPE are autonomous such that each realm has its own set of Forwarding Information Bases (FIBs) and no forwarding/routing information or other state is shared between the realms. This allows the realms to have non-unique address spaces if required and, more generally, isolates the realms from one another with respect to network address assignments.

For any particular Realm, one of the aggregate interfaces will likely be configured as a connection to the default forwarder. Forwarding information about the other interfaces is either configured statically through one of the management interfaces or via "MPOA" client (F7). Finally, the FIB will be updated automatically with the new link-local forwarding information when PPP, Bridged or IP/ATM and Bridged or IP/FR-ATM Service Interfaces are initiated or when Service Interface is disabled (either administratively or when the underlying connection closes).

An element of packet forwarding on the PIPE is the process used for discarding traffic when queues reach an overflow state. The PIPE provides two discard disciplines which are applied to the output queues. The first is a variant of Random Early Discard (RED) and the second is simple head-drop discard. The output queuing control is provided by a per service interface with a default setting of RED enabled.

With RED turned on, as the output queue approaches an overflow state, packets are discarded with a pseudo-random selection of the packets to discard exponentially weighted towards the earliest packets arriving. This is a simplified description of RED.

When RED is disabled, the transmit queues operate in a simple First In First Out (FIFO) discipline with discards performed at the tail of the queue as it reaches an overflow state. In the extreme case where overflow occurs on input, the PIPE card discards on the tail of the input queue as new packets arrive.

For VPNs which have the "MPOA" client lookup cache management function, the packet forwarding function applies a flow detection mechanism on source-destination sets which are not currently in the cache. This mechanism monitors the traffic for the new source-destination pair and identifies the traffic as a flow when the traffic reaches a rate of at least M packets in N seconds. The default values are 4 packets in 10 seconds. Only when a flow is detected does the "MPOA" client establish a short-cut path.

IP forwarding is the internetworking layer applied to each packet received on an IP routed service interface. This includes applying error checking rules and policy filtering, determining what to do with the packet in terms of the next-hop to its ultimate destination and finally queuing the packet for output or possible local delivery. Although Routed VPNs and Internet Access appear on the surface to be significantly different features, when examining the PIPE IP forwarding function those differences are mostly superficial. Routed VPNs tend to have a smaller set of address prefixes which change over time driven by supporting flow detection and consequently triggering "short-cuts". Internet Access typically requires a very large set of address prefixes which will change over time mostly based on updates provided by the route server via the Full Table Download function and the set of active interfaces will be relatively constant.

The IP forwarding function on the PIPE provides support for processing IP packets which are forwarded in and out of service interfaces which are operating using the LLC/SNAP bridged encapsulation. This function provides the necessary ARP capabilities to bind and maintain MAC addresses for the IP hosts on the remote LAN segment. This function is not supported for PPP bridged interfaces.

The IP forwarding mechanism (IFM) works by using various layer 3 information within each packet (along with information about which interface the packet arrived on) and switches packet traffic between the various PPP and IP/ATM links.

The following is a simplified description of the IFM with the terminology aligned to CSI:
1) the forwarder receives the IP packet (plus other details) from the link layer;
2) the forwarder validates the IP header;
3) the forwarder performs processing of most of any IP options;
4) the forwarder examines the destination IP address in the IP header against the FIB and assuming it satisfies basic requirements for forwarding;
5) the address of next hop for the packet (and the correct output interface) is determined;
6) the source address is tested for validity and any administrative constraints are applied;
7) the forwarder decrements TTL and then tests for expire;
8) the forwarder performs processing of any IP options which could not be completed in step 3;
9) the forwarder performs any necessary IP fragmentation;
10) the forwarder determines the link layer address of the next hop for the packet; and
11) finally the forwarder queues the packet for delivery on the interface out to the next hop.

For directed diagnostic an IP forwarding table dump is provided to verify the operational state of the FIBs The PIPE supports bridge forwarding within designated VPNs. Bridging is available between service interfaces which belong to the same VLAN and protocol family(s). Bridge forwarding on the PIPE can be characterized as half bridging since it is connected to another bridge via a point-to-point link.

Diagnostics on the PIPE for Bridge Forwarding include a bridge table dump and view of the current state configuration of spanning tree. This forwarding table dump and STP view matches the elements contained in the Bridge Management Information Base (MIB).

The bridging function on the PIPE card is determined by the configuration information sent to it by the RS. This configuration includes the definition of VPNs, VLANs and the services they offer. A service interface or set of service interfaces can only be bound to a VLAN or set of VLANs.

With this information configured on the PIPE the bridge function only forwards traffic between service interfaces in the same VLAN. In this way, traffic is forwarded to only a subset of service interfaces.

The Bridging Algorithm used for the PIPE follows the standard defined in IEEE 802.1. The following functions are performed by the PIPE as part of its bridging role: 1) Bridge packets from one Bridging interface to another; 2) Learning and Cache Management; and 3) Filter packets to prevent loops (informed by F7, the 802.1 (d) Spanning Tree Protocol).

The first function is the basic relay of packets from one end station to another on a different interface. The basic process is: 1) Bridged Packets are received by the PIPE; 2) The MAC address and service interface association of the sender are recorded in the PIPE's cache; 3) The Destination MAC contained in the packet is examined and matched to an entry in the PIPE's existing cache; 4) If an entry exists (the cache contains permanent entries for the reserved MAC broadcast and multicast addresses), the packet is passed out the associated output interface (for the broadcast/multicast entries this is the DF which then provides the correct flooding); 5) If an entry does not exist, a message is sent to the "MPOA" client function (F7) which will attempt to get a resolution for the Destination MAC; 6) If the Destination MAC is resolved, the packet is passed out the associated service interface (in same manner as step 4); otherwise 7) The packet is discarded.

The second function is MAC address learning and cache management. When packets are received by the PIPE, a record of the source MAC address and its related service interface is kept in a cache. This cache allows the PIPE to easily look up the relationship between the source and destination identified in the packet. If the configuration for the source and destination match, the packet is forwarded to the appropriate service interface. However, if the configuration does not match, the packet is discarded or checked for special handling, in the case of the RS, which is required to communicate with all stations.

The size of the cache, however, is not infinite so an aging mechanism is required to maintain a set of recently used records for source and destination to service interface/VLAN mappings. The aging function determines whether a cache entry has been used recently. If the entry has been used it is refreshed and maintained in the cache. If has not been used, the entry is deleted to make room for new cache entries.

The PIPE card will generate billing records every fifteen minutes using the same format as using by 36170 SVC records. Information will be provided in the records for transmitted packets, received packets, transmitted bytes, received bytes. Records will also be created when the PVC is disconnected. This will provide the data for the final portion of a fifteen minute interval for which the PVC was connected.

The Point-to-Point Protocol (PPP) provides an interoperable method for communicating multi-protocol network datagrams. The PIPE provides for the PPP termination of standard bit-synchronous PPP over HDLC connections into the 36170 CSI system by internetworking with the transparent HDLC frame forwarding function on 36170 FR cards which has an optional mode for providing an internetworking service which supports conversion of PPP packets to and from the PPP over AAL5 encapsulation. This function is intended to support the "leased-line" mode of operation for permanent IP services, for example T1/E1 ISP customer "feeds. LCP options are set by the network management entities through the service configuration for a particular realm and loaded through the "MPOA" Configuration.

The PIPE provides for static configuration of the authentication control information including the shared secrets used within the protocol. These are configurable via the network management entities and are normally loaded through the "MPOA" Configuration Server.

The IP Control Protocol is used on fully established and authenticated PPP links to negotiate the IP address at each end of the PPP link and to negotiate VJ TCP/IP header compression. The peer's IP address can be assigned or discovered and verified with this protocol, dependent on how the link has been configured to negotiate this option. By default, address assignment for the link peer and link local assignment from the peer are both disabled on the PIPE.

Van Jacobson (VJ) TCP/IP header compression, an option that can be negotiated in IP Control Protocol (IPCP) can reduce a standard 40 byte TCP/IP header to variable size header between 3 and 16 bytes for most of the TCP packets transmitted over a PPP connection. VJ header compression and decompression is a function supported on the PIPE. By default, it is disabled but it can be enabled on individual PPP service interfaces through the management interfaces. The use of VJ header compression does have an impact on performance and other resources in the PIPE. In addition, depending on the nature of traffic flowing across the link and the number of "VJ slots" assigned to it may provide little or no compression.

The Internet Engineering Task Force (IETF) standard PPP network control protocol (NCP) for bridging, the Bridge Control Protocol is used on fully established and authenticated PPP links terminating on the PIPE to negotiate the operation of transparent bridging of 802.3 LAN traffic. Until PPP has reached the Network Layer and BCP is fully negotiated, bridged data packets will be discarded by the PIPE.

Transparent bridging is accomplished by negotiating the following BCP options:

| BCP Option | Type | Description | Length | Default Value |
|---|---|---|---|---|
| MAC-Support negotiation | 3 | MAC type traffic supported Possible values: 1 = 802.3Ethernet only | 3 | 802.3 |
| Tinygram-Compression | 4 | Compression of a small PDU that has padding provided the PDU is smaler than the minimum PDU size and has a LAN Frame Checksum Possible values: 1 = enabled, 2 = disabled | 3 | 1 |
| Mac-Address | 6 | Ability to have MAC Address announced or assigned | 8 | |
| Spanning-Tree-Protocol negotiation | 7 | Negotiate version odf STP Possible Values: 0 = NULL, 1 = 802.1(d) | 3 | 802.1(d) |

The CSI system provides no support for the LAN-Identification option and, because there is no requirement, there is no support for options related to source-route bridging or proprietary Spanning Tree Protocols.

The Internetworking Realms on the PIPE provide an abstraction for organizing related service interfaces; the lower layer PPP and FR access ATM VC interfaces and associated aggregate interfaces into the core networks; and the addressing information of external network services required for normal operation. The PIPE supports a fixed number of independent realms and a fixed number of service interfaces. These interfaces are distributed across realms ensuring that each realm will have a fixed number of interfaces. For example, a PIPE supporting a maximum of 500 interfaces and 5 realms might be configured to handle 3 routed IP realms, 1 with 200 interfaces and 2 with 50 interfaces, and 2 bridged realms each with 100 interfaces. If a connection is attempted which exceeds the configured interface limit for a particular realm, the connection is refused.

The PIPE supports a few methods of administratively assigning network addresses and, where required, netmasks and forwarding prefixes (static routes), to the various FR, PPP and ATM link interfaces. In addition to the various link interfaces the PIPE provides an abstracted "null" interface which can be used in conjunction with the forwarding function to provide for discard (or black-holing) of various categories of traffic. The appropriate methods are determined when a new interface is configured on the PIPE depending on the specific type of Access Interface/Service Interface/Core Interface required. Once an interface is defined, but before the configuration applied and it is activated, the interface is linked to the appropriate realm, ensuring that the traffic associated with that interface will only be forwarded within the correct network address spaces.

Typically, PPP links will either be configured using the "numbered-numbered" model, where the PPP peers are the only two nodes in a distinct point-to-point subnet, or the "unnumbered-unnumbered" model, where the peers have no IP addresses for the PPP interfaces on the PPP link. The link simply provides a bi-directional path between two distinct subnets. The PPP links may also be configured using the "numbered-unnumbered" model which means that only the interface address of the remote peer from PIPE is set for the link. For the "unnumbered-unnumbered" and the "numbered-unnumbered" models the PIPE supports the use of the "local route server" address to help manage control of these types of connections.

The local address assignments for ATM and Frame Relay service interfaces are provided from the Configuration Server/Route Server based on the PIPE providing the information required to determine which Service Interface/Access Interface is currently serviced by the PIPE.

Inverse ARP (InARP) is the standard method, in older, non-MPOA environments, for network devices to discover the IP address of a peer device associated with a particular virtual circuit (e.g. ATM or Frame Relay). This allows for verification and dynamic configuration of address mappings rather than relying on static configuration of the ARP table. The PIPE can be configured to use InARP to discover the IP addresses of the network neighbors connected to the aggregate interfaces. Some existing implementations of IP over NBKA media have no support for Inverse ARP. To allow interoperation, controls for disabling/enabling INARP and for static ARP table administration are provided via the PIPE management entities. Service interfaces established and configured using MPOA do not support INARP.

Address assignments for the "MPOA" ATM VC core interfaces are provided from the Configuration Server and Route Server. The common controls for all Service Interfaces are Enabled/Disabled and Reset. In addition to being able to disable, enable or reset the interface the operator can examine the state of the interface and view various interface statistics. There are many statistics and configuration details which are common to all interfaces. The PIPE provides all of the relevant values defined in the current IF MIB and also provides a number of useful summary statistics through various management interfaces. In addition, diagnostics and controls have specific behaviors related to the various types of interfaces. Disable and Enable are used to temporarily block an interface from being used.

For PPP interfaces, Reset causes the PPP state machines to gracefully tear down the link and return to the initial state. This control is intended for forcing the controlled disconnection of specific PPP connections. For FR and ATM service interfaces, Reset causes the connect to redo any defined initial exchange. For both PPP and FR/ATM service interfaces, a reset causes all queues for the interface to be flushed.

Information relevant to tracing the PPP connection state is collected and made available through various management interfaces. Tracing of CHAP does not expose security specific details of the authentication protocol. The trace facility recognizes all assigned numbers for these PPP protocols listed in current IANA assigned numbers, including protocols and options not supported on the PIPE.

Information related to tracking the state of FR and ATM Service Interfaces and the ATM Core Interfaces is collected and made available through various management interfaces.

The PIPE provides a few control interfaces to aid in network and system diagnostics and maintenance: 1) Echo packet generation—provided to verify the IP protocol connectivity between PIPE and other network entities. The ICMP echo request is the basis of the commonly used PING command. The PIPE can generate such requests and forward them to other network entities. The PIPE also replies to ICMP echo requests.

2) Network path tracing—provided for tracing the route IP traffic takes to reach a particular destination host interface. This function is equivalent with the "traceroute" command in UNIX. The mechanism involves launching a specially sequenced stream of UDP probe packets and then listening for ICMP time-exceeded (TTL-expired) responses from the forwarding devices along the path. The addresses of intermediate devices that responded as IP packets traversed the path are displayed along with an estimate of the delay based on the round trip for each transaction.

The PIPE supports Spanning Tree Protocol as defined in IEEE 802.1(d. The Spanning Tree implementation allows for loop-free topology such that a path exists between every pair of LANs in the network. STP is negotiated on a per VPN basis, enabling each VPN to have a separate STP instance. STP does not apply to the Internet Access case.

Extensions to the standards are based on those defined below: 1) If the PIPE becomes unregistered all established SVCs are torn down, such that bridging traffic and STP BPDUs are not forwarded. 2) A configuration BPDU is recognized and ignored if it is received by its originator on the same port from which it was sent. 3) BPDU received over ATM from anything other than the through the "MPOA" client are ignored by the PIPE. (The "MPOA" client will drop any BPDU that is not received from a registered device.) 4) If the Bridge Aggregate interface for the particular realm goes into a blocking state, the destination cache must be flushed to ensure that no entries point to the [now blocked] interface. In addition, when the Bridge Aggregate returns to the forwarding state, the source cache for the realm is flushed so that it can resynchronized with the MPOA client5) Negotiation for the version of STP supported between registered devices is limited to protocol 1 (IEEE802.1 (d)) or NULL in the case where an external bridge does not support STP.

STP on the PIPE affects the state of one or more of its interfaces. Current STP states of the Service Interfaces are viewable via the NMTI management interface. The STP standard, described in IEEE 802.1 (d), provides for the following configurable parameters:

| | |
|---|---|
| Priority | used to determine the cost of using this bridge as root. |
| Max Age | amount of time before a configuration message should be deleted |
| Hello Time | time between configuration BPDU advertising root status |
| Forward Delay | length of time spend in intermediate state before changing from blocked to forward state |
| Aging Time | length of time since a root sent a configuration message |

These parameters are configurable through a management interface and accessible via SNMP. Default STP parameters are used in the absence of user configured values.

The PIPE communicates with the Configuration Server to resolve which Route Server is controlling each of the Realms supported by the PIPE. The PIPE communicates with each Route Server to register and verify new service interfaces, to declare new locally attached hosts and subnets, and to resolve remote bridged or network-layer addresses to ATM addresses.

After being initialized from the Control Card, the PIPE first connects to the Configuration Server. It uses the address configured for the Configuration Server which defaults to a well-known AESA anycast address. The traffic parameters are configurable.

The PIPE will be downloaded with information about each Realm within the system. This includes the ATM addresses of the primary and backup route servers. As the information changes, the Configuration Server keeps each of the PIPEs updated.

The connection to the Configuration Server is maintained continuously using a persistent SVC. If the connection fails or is released the persistent SVC mechanism will attempt a reconnect (with an initial period of 1 second) to the same anycast address and will continue to attempt the call indefinitely. Because of the nature of the anycast address mechanism when the new connection is eventually established it may even be to a different Configuration Server. The exact same procedures as explained for Initialization above apply to the new connection.

The Configuration Servers, in an N+1 redundant system of databases, distribute to each of the PIPEs the information necessary for establishing the LAN data and LAN control connections required for all the realms each of the PIPEs are serving.

After receiving the ATM Addresses of all of the Route Servers, the PIPE establishes a LAN Data connection to each of the Route Servers for each of the VPN/IA/Realms that it has Service Interfaces for. The traffic parameters are configurable on a per-VPN/LA/Realm basis. The connection does not use any assured delivery capabilities.

When a Route Server detects a LAN Data connection having been established, the Route Server starts the registration mechanism by sending the Register Server message (i.e. supplies the features it supports) to the PIPE. The PIPE responds with a Register Client message (supplies the features the PIPE supports) back to the Route Server. The Route Server then sends a Register Response message which indicates a successful registration.

Following successful registration, the PIPE establishes a LAN Control to the Route Server. This connection uses different traffic parameters that are again configurable on a per-Realm basis, and using the Q.SAAL assured delivery bearer mechanism. This connection is used provide various elements of configuration information. Also following successful registration, the Route Server will add the newly registered PIPE to a LAN Broadcast (point-to-multipoint) connection. The Route Server uses this connection for broadcast packets, multicast packets and for table downloads.

The LAN Data, LAN Control and LAN Broadcast connections are maintained continuously as long as Service Interfaces exist for the VPN. If a LAN Data or LAN Control connection is released the persistent SVC mechanism (with an initial period of 1 second) will attempt a reconnect using the current Route Server (e.g. primary) address. If the persistent SVC mechanism fails on the final exponential backoff to the current address, the PIPE clears any LAN Data, LAN Control and LAN Broadcast connections to the failed Route Server. An attempt is then made to set up the LAN Data connection to the other Route Server (e.g. backup) address, thereby restarting the registration process.

Since the PIPE cannot control its addition to the LAN Broadcast connection, it cannot engage in the persistent SVC mechanism for this connection. Instead, the PIPE relies on the current (e.g. primary) Route Server to perform the persistent SVC mechanism. On detection of the loss of the LAN Broadcast connection the PIPE will however begin a timer of duration equivalent to, but slightly longer than the total duration of the persistent SVC mechanism's retry period. This timer is canceled should the errant LAN Broadcast connection be re-established. On expiry of this timer, the PIPE will clear any LAN Data or LAN Control connections to the failed Route Server. The PIPE will then attempt to set up the LAN Data connection to the other Route Server (e.g. backup) address, thereby restarting the registration process.

If the persistent SVC mechanism fails on the final exponential backoff to both Route Servers for a VPN/IA/Realm, then the PIPE informs the Configuration Server that that particular set of Route Servers is unreachable and a major alarm is raised on the 36170.

After ~1.3 times the Route Server cold-start time and including a random factor of +0.15 RS cold start time of outage of the LAN Data connection, the operation of this Realm ceases. All cache entries are removed. This limits the potential of creating forwarding loops and unintended blackholes within the network.

The PIPE supports bridged VLANs for any protocol family. Bridged VLANs separate traffic of different protocols and limit the protocols that can be used to communicate from specific hosts. They can carry all network-layer protocol families or any of the following: 1) IP 2) IPX (Internet Packet eXchange) 3) XNS (Xerox Network System) 4) SNA (Systems Network Architecture) 5) NetBIOS (Network Basic Input/Output System) 6) CLNP 7) Banyan VINES (Virtual Network System) 8) AppleTalk 9) DECnet 10) LAT (Local Area Transport).

VLAN membership is configured from the route server. There is no local support for configuring bridged VLANs.

The PIPE supports routed virtual subnets for the IP protocol only. Membership in a virtual subnet determines PPP IP address assignment, broadcast groups, etc. Membership in virtual subnets is configured from the route server. There is no local support.

Service Interfaces can belong to multiple VLANs and Virtual Subnets. A Service Interface can belong to no more than one VLAN which supports the same protocol. A Service Interface can belong to many virtual subnets provided there is no overlap in assigned subnet IP addresses.

Except in the case of the Internet Access service, all other Realms (the VPNs) use the VIVID cache management protocols with the route server to learn and provide information about MAC and Network-layer addresses.

The Internet Access service uses Table Download (TD) in addition to the Cache Management protocols described above. The Table Download process begins with the Route Server providing the minimal set of cached Network-layer (IP) addresses required to allow the PIPE to begin processing. Following the initial table phase, the Table Download process continues with the final table phase. During this phase, the Route Server provides all remaining applicable Network-layer (IP) addresses.

At any time following the initial table download, table maintenance (adds & deletes) is performed using the VIVID cache management protocols described above.

Table Download may occur under any of three conditions: 1) Network cold start. 2) Partial network restart/cold start (multiple PIPES). 3) Single PIPE restart/reconfig.

In fact, Table Download may begin under a single PIPE restart condition (3) which may later turn out to be a partial network restart condition (2). Table Download will utilize the unicast LAN Control SVC during the initial table phase of Table Download. In order to provide good system start up performance without impacting the system when only a single PIPE is restarting, Table Download will utilize unicast (LAN Control) or multicast (LAN Broadcast) facilities depending on the number of PIPEs in the final table phase of Table Download. Table Download will also be capable of switching from using unicast (LAN Control) to multicast (LAN Broadcast) facilities as PIPEs enter the final table phase of Table Download.

Paths are constructed between Forwarders using SVCs set up using the ATM Address in the path table, the configured traffic descriptor for paths in the particular Realm, and B-HLI parameters indicating the type of device (the PIPE) that is establishing the connection. Parallel paths between Forwarders are disallowed except where difference levels of CoS are required. Two types of paths may be created between Forwarders (PIPEs) 1) aged; and 2) permanent.

The determination that a path is aged or permanent is made based on aging information provided by the Route Server when a path table entry (egress IP to ATM address mapping) is downloaded to the PIPE. The Route Server provides path table entries either as part of initial table download or on an exception basis.

Aged paths are set up on demand, whenever a datagram is received whose Network-layer (IP) address is mapped to an ATM Address where no SVC currently exists. These paths are aged out when there has been no data flowing over the connection for at configurable period of time. Age time is configurable on a per path basis. The default age time is 30 seconds. Aging out causes the SVC for the path to be released. When new data arrives for the path, the SVC is re-established. While the path is being established or re-established, data is forwarded to the Default Forwarder.

Permanent paths are set up as soon as a path table entry is provided to the PIPE by the Route Server and are maintained using the persistent SVC mechanisms. Should the persistent SVC for a path fail on its final exponential backoff, the Route Server will be informed so that routing information can be re-calculated. The PIPE will continue periodic attempts to re-establish the persistent SVC for the path. When the persistent SVC for the path is re-established, the Route Server is again notified so that that routing information can again be re-calculated.

Paths may be viewed from a management interface. The paths the connections take through the network can only be derived manually. There is no call trace support for these connections.

N+M PIPE Redundancy is a form of warm redundancy that can optionally be enabled for the PIPE. The redundancy applies only within an individual 36170 and applies to the whole 36170. Separate independent N+M partitions are not available.

N PIPE cards are providing service to the N PIPE instances that have Service Interfaces programmed. M PIPE cards, referred to as the spare cards, are sitting around idle waiting for one of the N PIPE cards to fail.

A PIPE Instance is a floating set of functionality which can be placed on any PIPE Card within the 36170. It is identified by an 8-bit number. Service Interfaces are assigned to a PIPE Instance through management interaction. All CSI configuration, application maintenance, and statistics are performed by identifying the PIPE Instance, not the PIPE slotId. The slotId is only used for card-specific maintenance, such as resetting, software downloading, etc. Everywhere else the PIPE instance is referred to as a PIPE.

The operation and the alarms that result from the operation of this redundancy scheme will be similar. The FS describes the dynamic nature of the assignment of PIPE Instances for service on PIPE Cards. It is to be noted that lower PIPE Instance numbers receive higher priority for assignment to a PIPE Card although the priority is non-preemptive.

When a non-spare (active) PIPE running applications becomes unavailable, all applications on the card are moved to a spare PIPE if it is available. Since PIPE N+M redundancy is not hot redundancy, the service interfaces and other applications are reset to the initial state. All current short-cuts and connections to the RS/CS are released. One of the formerly spare PIPE becomes active. This PIPE card starts setting up connections to the Configuration Server and the appropriate Route Servers and creates the necessary short-cuts.

INDUSTRIAL APPLICABILITY

The present invention is applicable in the provision of internetworking services wherein a common backbone infrastructure is shared by several distinct user networks. The infrastructure is shared through the concept of independent realms, each representing an instance of a virtual private network or public Internet access.

The Carrier Scale Internetworking (CSI) system, in particular, provides for the cost-effective deployment of differentiable internetworking services. CSI provides for both Virtual Public Network (VPN) and Public Internet services offering per-customer differentiable traffic handling. In the VPN case, the solution framework provides for customer isolation including segregation of resources (e.g. address spaces, bandwidth).

While particular embodiments of the invention have been described and illustrated it will be apparent to one skilled in the art that numerous changes can be made to the basic concept. It is to be understood that such changes will fall within the full scope of the invention as defined by the appended claims.

We claim:

1. A packet forwarding system for use in a communications network providing internetworking services to a plurality of distinct and isolated user networks, comprising:
    at least one edge forwarder terminating a plurality of service interfaces and forwarding packets received on said service interfaces in accordance with forwarding information received from at least one route server, wherein
    at least two of the service interfaces from the plurality of service interfaces is uniquely associatable to one of the plurality of distinct and isolated user networks;
    said at least one route server is adapted to compute the forwarding information appropriate to the user networks based on at least routing information exchanged with other routing agents, the forwarding information including multiple forwarding rules being particular to the respective service interfaces of the corresponding user networks; and
    said at least one edge forwarder being adapted to forward each received packet according to an appropriate forwarding rule selected from the multiple forwarding rules based on the service interface from which the packets is received and a destination address in the received packet.

2. The packet forwarding system of claim 1 wherein each edge forwarder sends multicast join requests and multicast leave requests to the at least one route server which computes corresponding forwarding rules distributed to each edge forwarder.

3. The packet forwarding system of claim 1 wherein said at least one route server computes the forwarding information also on the basis of policy information.

* * * * *